US008818394B2

(12) United States Patent
Bienas et al.

(10) Patent No.: US 8,818,394 B2
(45) Date of Patent: Aug. 26, 2014

(54) MOBILE RADIO COMMUNICATION DEVICES HAVING A TRUSTED PROCESSING ENVIRONMENT AND METHOD FOR PROCESSING A COMPUTER PROGRAM THEREIN

(75) Inventors: Maik Bienas, Braunschweig (DE); Achim Luft, Braunschweig (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 525 days.

(21) Appl. No.: 12/999,063

(22) PCT Filed: Jul. 11, 2008

(86) PCT No.: PCT/EP2008/059076
§ 371 (c)(1),
(2), (4) Date: Dec. 15, 2010

(87) PCT Pub. No.: WO2010/003464
PCT Pub. Date: Jan. 14, 2010

(65) Prior Publication Data
US 2011/0098075 A1     Apr. 28, 2011

(51) Int. Cl.
*H04W 16/14* (2009.01)
(52) U.S. Cl.
USPC ............ 455/454; 455/555; 455/411; 455/434
(58) Field of Classification Search
USPC ........... 455/422.1, 411, 410, 426.1, 434, 446, 455/454, 459, 462, 67.11, 550.1, 556.2, 455/420, 517, 68, 553.1, 555, 557; 713/168
See application file for complete search history.

(56) References Cited

U.S. PATENT DOCUMENTS

| | | | |
|---|---|---|---|
| 7,929,500 B2 | 4/2011 | Hur et al. | |
| 8,332,653 B2 * | 12/2012 | Buer | 713/189 |
| 2004/0103308 A1 | 5/2004 | Paller | |
| 2005/0010774 A1 | 1/2005 | Rose et al. | |
| 2007/0271458 A1 * | 11/2007 | Bosch et al. | 713/168 |
| 2008/0026771 A1 * | 1/2008 | Hill | 455/456.1 |
| 2008/0076392 A1 | 3/2008 | Khetawat et al. | |
| 2010/0049970 A1 * | 2/2010 | Fraleigh et al. | 713/156 |
| 2012/0167191 A1 * | 6/2012 | Lauper | 726/7 |

FOREIGN PATENT DOCUMENTS

| | | |
|---|---|---|
| CN | 1780486 A | 5/2006 |
| JP | 2007068114 A | 3/2007 |
| KR | 1020080005877 A | 1/2008 |

OTHER PUBLICATIONS

International Preliminary Report on Patentability dated Jan. 20, 2011.
International Search Report of PCT/EP2008/059076 dated Feb. 18, 2009.
English language abstract for JP2007068114A.
Office Action received for German Patent Application No. 112008003905, mailed on Nov. 13, 2013, 9 pages of Office Action including 3 pages of English Translation.
Office Action received for China Patent Application No. 200880130311.2, mailed on Oct. 10, 2013, 14 pages of Office Action including 9 pages of English Translation.

* cited by examiner

*Primary Examiner* — John J Lee
(74) *Attorney, Agent, or Firm* — Schwabe, Williamson & Wyatt, P.C.

(57) ABSTRACT

In an embodiment, a mobile radio communication device is provided. The mobile radio communication device may include a mobile radio communication protocol circuit configured to provide a mobile radio base station function for a mobile radio communication with another mobile radio communication device, a network control interface circuit configured to receive communication control signals from a mobile radio network circuit being controlled by a mobile radio network operator to control the mobile radio communication protocol circuit, and a trusted processing circuit configured to process a computer program in a trusted processing environment to provide a trusted processing result, wherein the trusted processing circuit is outside of the mobile radio network operator's domain.

20 Claims, 15 Drawing Sheets

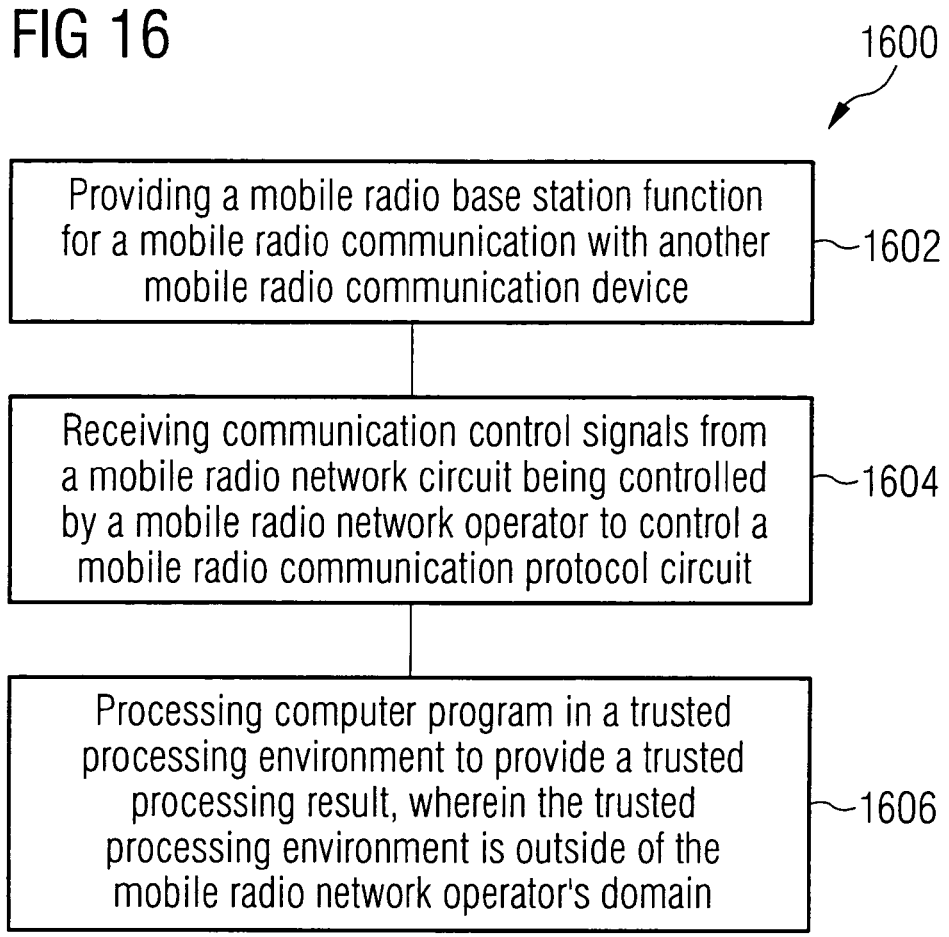

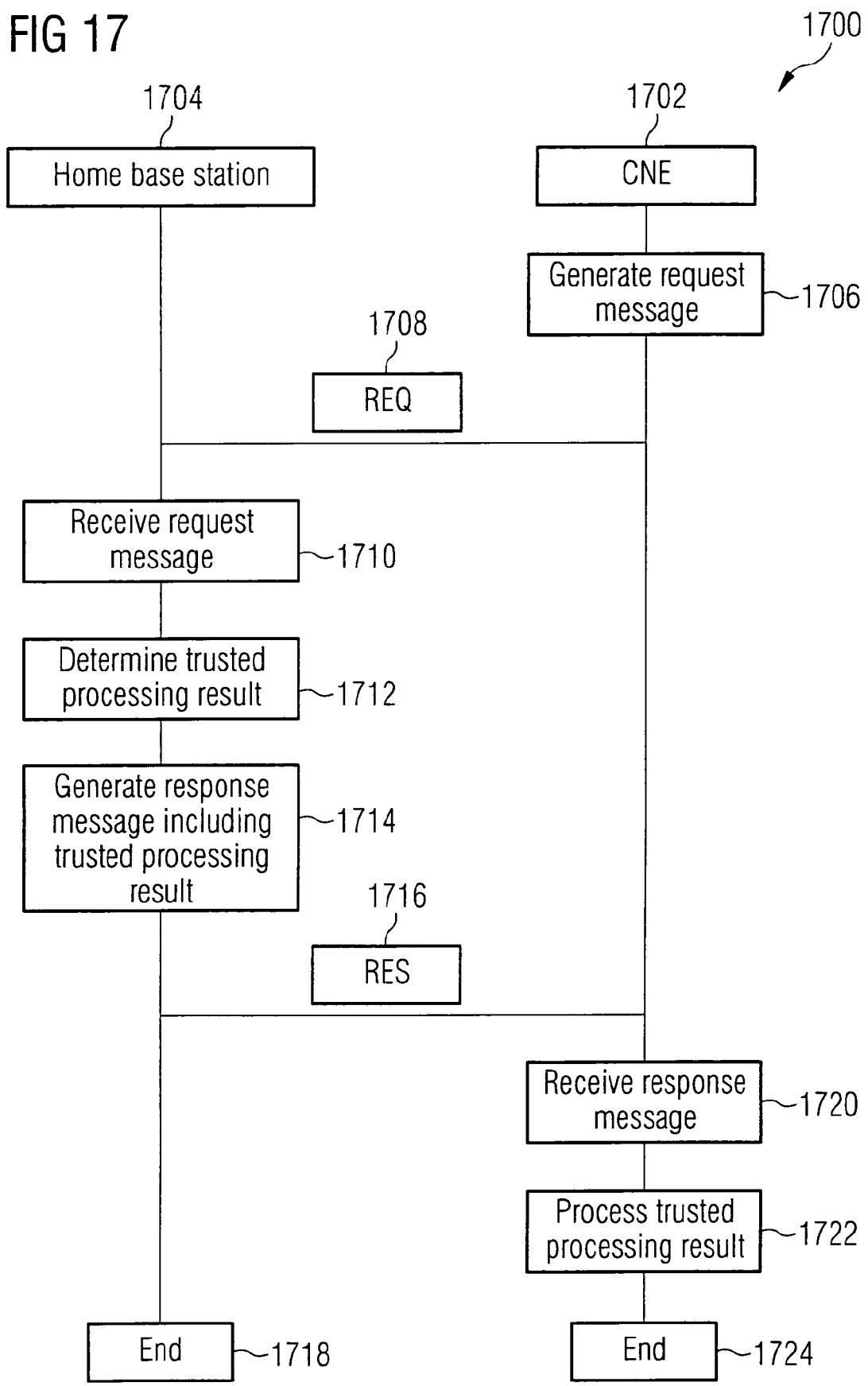

MOBILE RADIO COMMUNICATION DEVICES HAVING A TRUSTED PROCESSING ENVIRONMENT AND METHOD FOR PROCESSING A COMPUTER PROGRAM THEREIN

RELATED APPLICATIONS

The present application is a national stage entry according to 35 U.S.C. §371 of PCT application No.: PCT/EP2008/059076 filed on Jul. 11, 2008.

TECHNICAL FIELD

Various embodiments relate generally to mobile radio communication devices having a trusted processing environment and method for processing a computer program therein.

BACKGROUND

A 'NodeB' may be understood as a base station designed for Universal Mobile Telecommunication System (UMTS) that is controlled by a Radio Network Controller (RNC). A NodeB is usually capable of taking care of up to six UMTS radio cells. All NodeBs and all RNCs together usually form the so-called UMTS Terrestrial Radio Access Network (UTRAN) of a Mobile Network Operator (MNO).

In 3GPP ($3^{rd}$ Generation Partnership Project), concepts are developed for supporting the deployment of so-called 'Home NodeBs' or 'Home eNodeBs' for the following Radio Access Technologies, for example:
- 3G UMTS (UMTS based on Code Division Multiple Access (CDMA), also referred to as 'UTRA' in 3GPP terminology);
- and its successor technology
- 3.9G LTE (Long Term Evolution, also referred to as 'E-UTRA' in 3GPP terminology).

A 'Home NodeB' or 'Home eNodeB' may be understood in accordance with 3GPP as a trimmed-down version of a base station optimized for use in residential or corporate environments (e.g., private homes, public restaurants or small office areas).

As will be described in more detail below, there is a need for a provision of reliable and trustworthy information in a mobile radio network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 16 shows a method for processing a computer program in a mobile radio communication device in accordance with an embodiment in a flow diagram; and FIG. 17 shows a method for providing a trusted processing result in a mobile radio communication device in accordance with an embodiment in a message flow diagram.

DESCRIPTION

In the description, the terms "connection" and "coupling" are intended to include a direct as well as an indirect "connection" and "coupling", respectively.

Furthermore, in an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "circuit" in accordance with an alternative embodiment. In an embodiment, a plurality of circuits may be partially or completely implemented in one common circuit such as e.g. in one common processor such as e.g. one common microprocessor.

A "controller" may be understood as any kind of a control logic implementing entity, which may be hardware, software, firmware, or any combination thereof. A "controller" may include one or a plurality of processors, e.g. one or a plurality of programmable processors such as e.g. one or a plurality of programmable microprocessors. A "controller" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "controller" in accordance with an alternative embodiment. A controller may alternatively or in addition include one or a plurality of application-specific integrated circuits (ASICs)

and/or one or a plurality of programmable gate arrays (PGAs), e.g. field programmable gate arrays (FPGAs).

Although in FIGS. 1 and 2, for reasons of simplicity, the architecture of a UMTS mobile radio system 100 will be described in detail, it is to be noted that the various embodiments are also provided for any other suitable mobile radio system such as e.g. LTE (Long Term Evolution).

Figure 1:
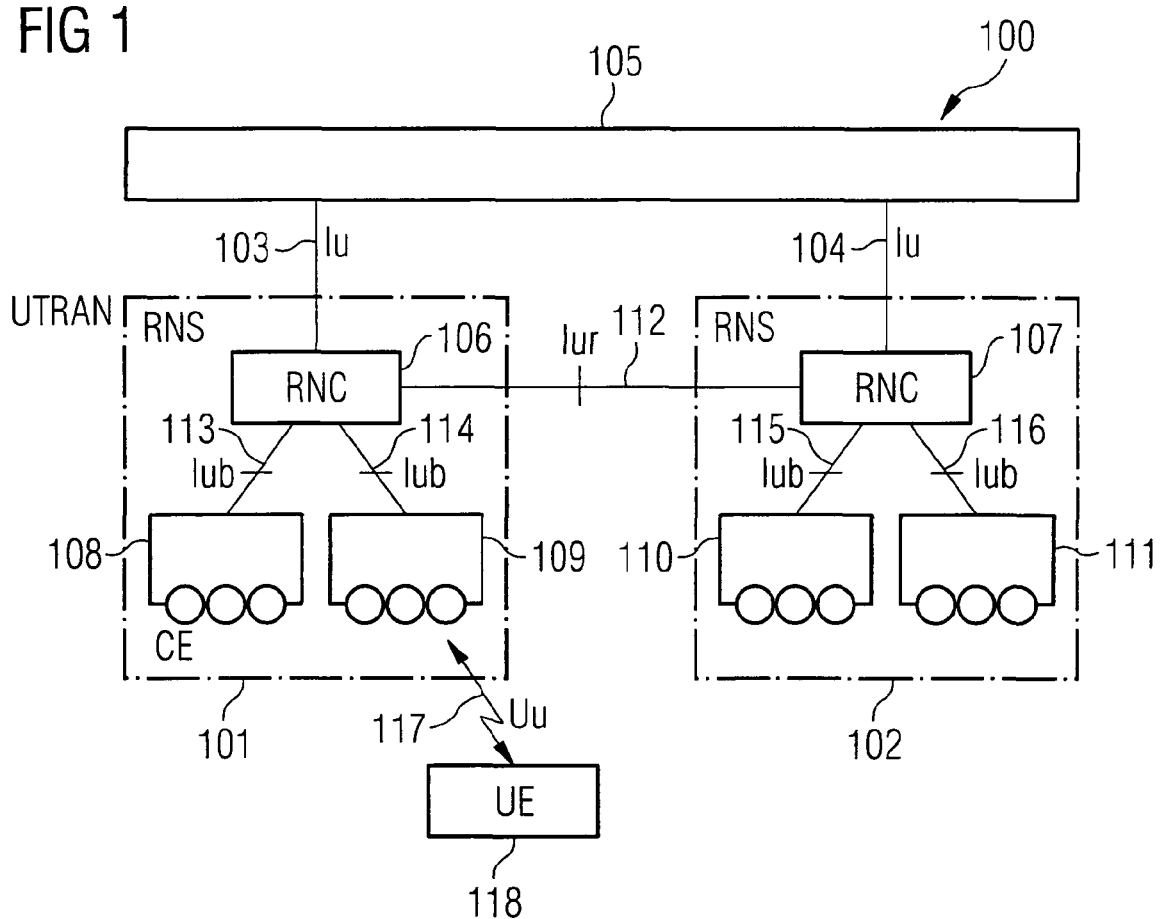
FIG. 1 shows a communication system based on an embodiment.

FIG. 1 shows a UMTS (Universal Mobile Telecommunication System) mobile radio system 100, and for reasons of simpler illustration particularly the components of the UMTS mobile radio access network (UMTS Terrestrial Radio Access Network, UTRAN), which has a plurality of mobile radio network subsystems (RNS) 101, 102 which are respectively connected by means of an "Iu" interface 103, 104 to the core network (CN) 105 in UMTS. A mobile radio network subsystem 101, 102 has a respective mobile radio network control entity (Radio Network Controller, RNC) 106, 107 and also one or more base stations 108, 109, 110, 111, which are also called NodeB in UMTS. In an embodiment, a 'NodeB' may be understood as a base station designed for UMTS that is controlled by a Radio Network Controller (RNC) 106, 107. A NodeB is usually capable of taking care of a plurality of, e.g. of up to six UMTS mobile radio cells. All NodeBs and all RNCs together usually form the so-called UMTS Terrestrial Radio Access Network (UTRAN) of a Mobile Network Operator (MNO).

As will be described in more detail below, some of the base stations (in this example, the base stations denoted with reference numbers 109 and 111, may be configured as Home NodeBs. In an example, a 'Home NodeB' may be understood in accordance with 3GPP as a trimmed-down version of a base station optimized for use in residential or corporate environments (e.g., private homes, public restaurants or small office areas). In various examples throughout this description, the terms 'Home Base Station', 'Home NodeB', 'Home eNodeB', and 'Femto Cell' are referring to the same logical entity and will be used interchangeably throughout the entire description.

As will be described in more detail below, the devices and methods in accordance with various embodiments e.g. for supporting the deployment of 'Home NodeBs' for 3G and the deployment of 'Home eNodeBs' for 3.9G Radio Access Technologies (RATs), such as UTRA and E-UTRA, allow a Mobile Network Operator (MNO) to dynamically distribute radio resources of a Home Base Station (HBS) among users of a closed subscriber group and public users (in the following also referred to as public subscriber group) that are also in coverage of the respective 'Home NodeB' or 'Home eNodeB'.

Within a mobile radio access network according to UTRAN, the mobile radio network control entities 106, 107 of the individual mobile radio network subsystems 101, 102 are connected to one another by means of an "Iur" interface 112. Each mobile radio network control entity 106, 107 respectively monitors the assignment of mobile radio resources for all the mobile radio cells in a mobile radio network subsystem 101, 102.

A base station 108, 109, 110, 111 is respectively connected to a mobile radio network control entity 106, 107 associated with the base station by means of an "Iub" interface 113, 114, 115, 116.

Each base station 108, 109, 110, 111 illustratively may provide radio coverage for one or more mobile radio cells (CE) within a mobile radio network subsystem 101, 102. Between a respective base station 108, 109, 110, 111 and a subscriber terminal 118 (user equipment, UE), subsequently also called mobile radio terminal, in a mobile radio cell, control signals or data signals may be transmitted using an air interface, called "Uu" air interface 117 in UMTS, e.g. using a multiple access transmission method.

By way of example, the UMTS-FDD mode (Frequency Division Duplex) is used to achieve separate signal transmission in the uplink and downlink directions (Uplink: signal transmission from the mobile radio terminal 118 to the respective UMTS base station 108, 109, 110, 111; downlink: signal transmission from the respective associated UMTS base station 108, 109, 110, 111 to the mobile radio terminal 118) through appropriate separate assignment of frequencies or frequency ranges.

A plurality of subscribers, in other words a plurality of activated mobile radio terminals 118 registered in the mobile radio access network, in the same mobile radio cell may have their signaling separated from one another using orthogonal codes, particularly using the "CDMA method" (Code Division Multiple Access).

In this context, it should be noted that FIG. 1 only shows one mobile radio terminal 118 for reasons of a simple illustration. In general, however any number of mobile radio terminals 118 may be provided in the mobile radio system 100 in other embodiments.

As mentioned above, it should be noted that FIG. 1 shows the UMTS network architecture, but the principles of the various disclosed embodiments are provided as well for other radio access technologies (RATs), such as e.g. LTE.

The communication between a mobile radio terminal 118 and another communication terminal can be set up using a complete mobile radio communication link to another mobile radio terminal, alternatively to a landline communication terminal.

Figure 2:
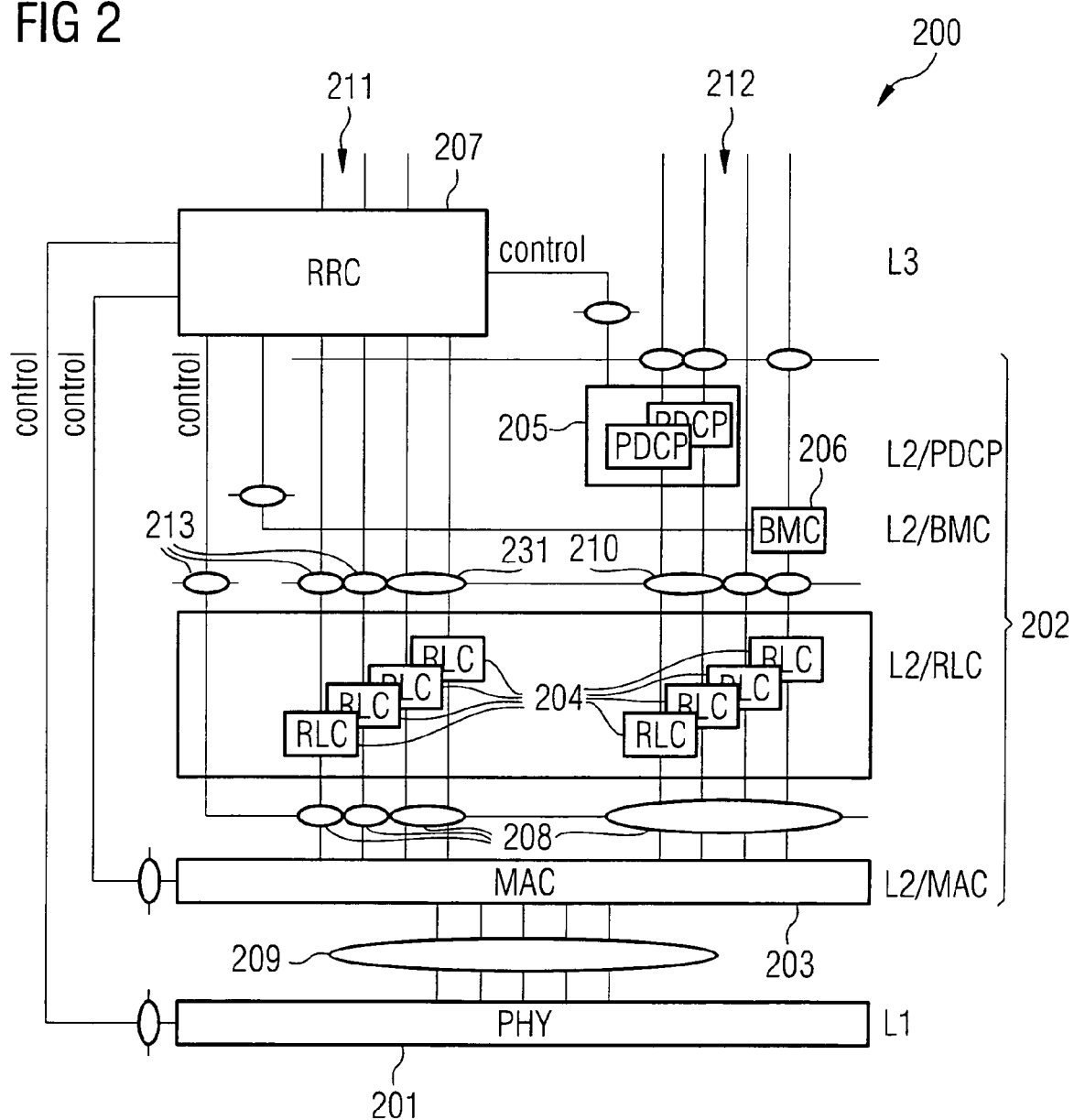
FIG. 2 shows an illustration of a protocol structure for the UMTS air interface in accordance with an embodiment.

As FIG. 2 shows, the UMTS air interface 117 is logically divided into three protocol layers (symbolized in FIG. 2 by a protocol layer arrangement 200). The entities ensuring and providing the functionality of the respective protocol layers described below are implemented both in the mobile radio terminal 118 and in the UTRAN base station 108, 109, 110, 111 or in the respective UTRAN mobile radio network control entity 106, 107. It should be noted that in case of LTE the entities ensuring and providing the functionality of the respective protocol layers may be implemented in the mobile radio terminal 118 and in the corresponding E-UTRAN base stations. The respective entities may be implemented in one or more circuits or in one or more controllers.

FIG. 2 shows the UMTS protocol structure 200 for instance from the viewpoint of a dedicated transport channel in accordance with an embodiment.

The bottommost layer shown in FIG. 2 is the physical layer PHY 201, which represents the protocol layer 1 on the basis of the OSI reference model (Open System Interconnection) on the basis of the ISO (International Standardisation Organisation).

The protocol layer arranged above the physical layer 201 is the data link layer 202, protocol layer 2 on the basis of the OSI reference model, which for its part has a plurality of subprotocol layers, namely the Medium Access Control protocol Layer (MAC protocol layer) 203, the Radio Link Control protocol layer 204 (RLC protocol layer), the Packet Data Convergence Protocol protocol layer 205 (PDCP protocol layer), and also the Broadcast/Multicast Control protocol layer 206 (BMC protocol layer), for example.

The topmost layer of the UMTS air interface Uu is the mobile radio network layer (protocol layer 3 on the basis of the OSI reference model), having the mobile radio resource control entity 207 (Radio Resource Control protocol layer, RRC protocol layer).

Each protocol layer 201, 202, 203, 204, 205, 206, 207 may provide the protocol layer above it with its services via pre-scribed, defined service access points.

To provide a better understanding of the communication protocol layer architecture, the service access points have been provided with generally customary and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 or the BMC protocol layer 206, and also signalling radio bearers (SRB) 213 between the RLC protocol layer 204 and the RRC protocol layer 207.

On the basis of UMTS, the protocol structure 200 shown in FIG. 2 is split not just horizontally into the above-described protocol layers and units of the respective protocol layers, but also vertically into a "control protocol plane" 211 (Control plane, C plane), which contains parts of the physical layer 201, parts of the MAC protocol layer 203, parts of the RLC protocol layer 204 and also the RRC protocol layer 207, and the user protocol plane 212 (User plane, U plane), which contains parts of the physical layer 201, parts of the MAC protocol layer 203, parts of the RLC protocol layer 204, the PDCP protocol layer 205 and also the BMC protocol layer 206.

In LTE the protocol structure looks similar to the protocol structure for UMTS shown in FIG. 2 with the main difference that the LTE "control protocol plane" may also contain parts of the PDCP protocol layer.

The entities of the control protocol plane 211 may be used to transmit exclusively control data, which are required for setting up and clearing down and also maintaining a communication link, whereas the entities of the user protocol plane 212 may be used to transmit the actual user data (or useful data).

Each communication protocol layer or each entity of a respective communication protocol layer may have particular prescribed functions during mobile radio communication. The transmitter end may need to ensure the task of the physical layer 201 or of the entities of the physical layer 201, the secure transmission via the air interface 117 of data coming from the MAC protocol layer 203. In this connection, the data may be mapped onto physical channels (not shown in FIG. 2). The physical layer 201 may provide the MAC protocol layer 203 with its services via transport channels 209 and these may be used to stipulate how and with what characteristics the data are to be transported via the air interface 117. The fundamental functions which may be provided by the entities of the physical layer 201 may include channel coding, modulation and CDMA code spreading (or the corresponding functions in LTE with respect to OFDMA). Correspondingly, the physical layer 201 or the entities of the physical layer 201 at the receiver end may carry out the CDMA code despreading, demodulation and the decoding of the received data and then forward these data to the MAC protocol layer 203 or entities of the MAC layer 203 at the receiver for further processing.

The MAC protocol layer 203 or the entities of the MAC protocol layer 203 may provide the RLC protocol layer 204 with its or their services using logical channels 208 as service access points and these may be used to characterize what type of file the transported data involve. The task of the MAC protocol layer 203 in the transmitter, e.g., during data transmission in the uplink direction in the mobile radio terminal 118, may be particularly to map the data which are present on a logical channel 208 above the MAC protocol layer 203 onto the transport channels 209 of the physical layer 201. The physical layer 201 may provide the transport channels 209 with discrete transmission rates for this. It may therefore be a function of the MAC protocol layer 203 or of the entities of the MAC protocol layer 203 in the mobile radio terminal 118 in the transmission situation to select a suitable transport format (TF) for each configured transport channel on the basis of the respective current data transmission rate and the respective data priority of the logical channels 208 which may be mapped onto the respective transport channel 209, and also the available transmission power of the mobile radio terminal 118 (UE). A transport format contains, inter alia, a stipulation of how many MAC data packet units, called transport block, may be transmitted, in other words transferred, to the physical layer 201 via the transport channel 209 per transmission period TTI (Transmission Time Interval). The admissible transport formats and also the admissible combinations of the transport formats for the various transport channels 209 may be signalled to the mobile radio terminal 118 by the mobile radio network control unit 106, 107 when a communication link is set up. In the receiver, the entities of the MAC protocol layer 203 may split the transport blocks received on the transport channels 209 over the logical channels 208 again.

In UMTS, the MAC protocol layer or the entities of the MAC protocol layer 203 may have a plurality of e.g. three logical entities. The "MAC-d entity" (MAC dedicated entity) may handle the useful data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh entity (MAC control/shared entity) may handle the useful data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b entity (MAC broadcast entity) may handle only the mobile radio cell-related system information, which is mapped via the logical channel BCCH (Broadcast Control Channel) onto the transport channel BCH (Broadcast Channel) and is transmitted by broadcast to all of the mobile radio terminals 118 in the respective mobile radio cell. In LTE, the MAC protocol layer differs from UMTS, as there is no distinction between the different types of MAC entities MAC-d, MAC-c/-sh and MAC-b.

Using the UMTS RLC protocol layer 204 or using the entities of the RLC protocol layer 204, the RRC protocol layer 207 may be provided with its services by means of signalling radio bearers (SRB) 213 as service access points, and the PDCP protocol layer 205 and the BMC protocol layer 206 are provided with their services by means of radio bearers (RB) 210 as service access points. The signalling radio bearers and the radio bearers may characterize the way in which the RLC protocol layer 204 may need to handle the data packets. To this end, by way of example, the RRC protocol layer 207 stipulates the transmission mode for each configured signalling radio bearer or radio bearer. The following transmission modes are provided in UMTS:

Transparent mode (TM),
Unacknowledged mode (UM), or
Acknowledged mode (AM).

The RLC protocol layer 204 may be implemented such that there is an independent RLC entity for each radio bearer or signalling radio bearer. In addition, the task of the RLC protocol layer or of its entities 204 in the transmission device is to split or assemble the useful data and the signalling data from radio bearers or signalling radio bearers into data packets. The RLC protocol layer 204 may transfer the data packets produced after the split or the assembly to the MAC protocol layer 203 for further transport or for further processing.

The PDCP protocol layer 205 or the entities of the PDCP protocol layer 205 may be set up to transmit or to receive data from the "Packet Switched Domain" (PS domain). The main function of the PDCP protocol layer 205 may be to compress or decompress the IP header information (Internet Protocol header information).

The BMC protocol layer 206 or its entities may be used to transmit or to receive "cell broadcast messages" via the air interface.

The RRC protocol layer 207 or the entities of the RRC protocol layer 207 may be responsible for setting up and clearing down and reconfiguring physical channels, transport channels 209, logical channels 208, signalling radio bearers 213 and radio bearers 210 and also for negotiating all of the parameters of the protocol layer 1, i.e. of the physical layer 201 and of the protocol layer 2. To this end, the RRC entities, i.e. the entities of the RRC protocol layer 207, in the mobile radio network control unit 106, 107 and the respective mobile radio terminal 118 may interchange appropriate RRC messages, via the signalling radio bearers 213.

In contrast to UMA technologies (Unlicensed Mobile Access: telecommunication technique allowing seamless roaming and handover between wireless local area networks operating in the unlicensed frequency bands, such as Bluetooth, DECT or WiFi, and wireless wide area networks, such as GSM/GPRS or UMTS), a legacy 'NodeB' or 'eNodeB' as defined by 3GPP is conventionally under direct physical control (in other words, is in the domain) of a Mobile Network Operator (MNO) and will be operated only on frequencies that are assigned to a specific MNO by license agreements. Conventionally, these frequencies were, by way of example, sold by auction to the MNO.

As will be described in more detail below, various embodiments address an increasing threat from the convergence of WiFi, VoIP and fixed telephony inside people's homes that today's mobile network operators perceive. Various embodiments provide ways to increase the mobile network operators' share of the residential calls market. The so-called 'Home Base Station' concept shall support receiving and initiating cellular calls at home, and uses a broadband connection (typically DSL, cable modem or fibre optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A cell which indicates being a CSG Cell may need to provide its CSG Identity to the UEs 118. Such a cell may only be suitable for a UE 118 if its CSG Identity is in the UE's 118 CSG white list (a list of CSG Identities maintained in the UE 118 or in an associated smart card indicating the cells which a particular UE 118 is allowed to use for communication).

As a 'Femto Cell' entity or 'Home Base Station' entity will usually be a box of small size and physically under control of the user, in other words, out of the MNO's domain, it could be used nomadically, i.e. the user may decide to operate it in his apartment, but also in a hotel when he is away from home, e.g. as a business traveller. Additionally a 'Home NodeB' may be operated only temporarily, i.e. it can be switched on and off from time to time, e.g. because the user does not want to operate it over night or when he leaves his apartment. The operation modes described here represent new challenges to the MNO's mobile radio core network. Legacy Base Stations may be operated permanently at a fixed location, and the MNO allocates a different set of radio resources (e.g., carrier frequencies, time slots and/or codes, etc.) to neighboring NodeBs or eNodeBs in his mobile radio communication network in order to minimize mutual interference between them.

Figure 3:
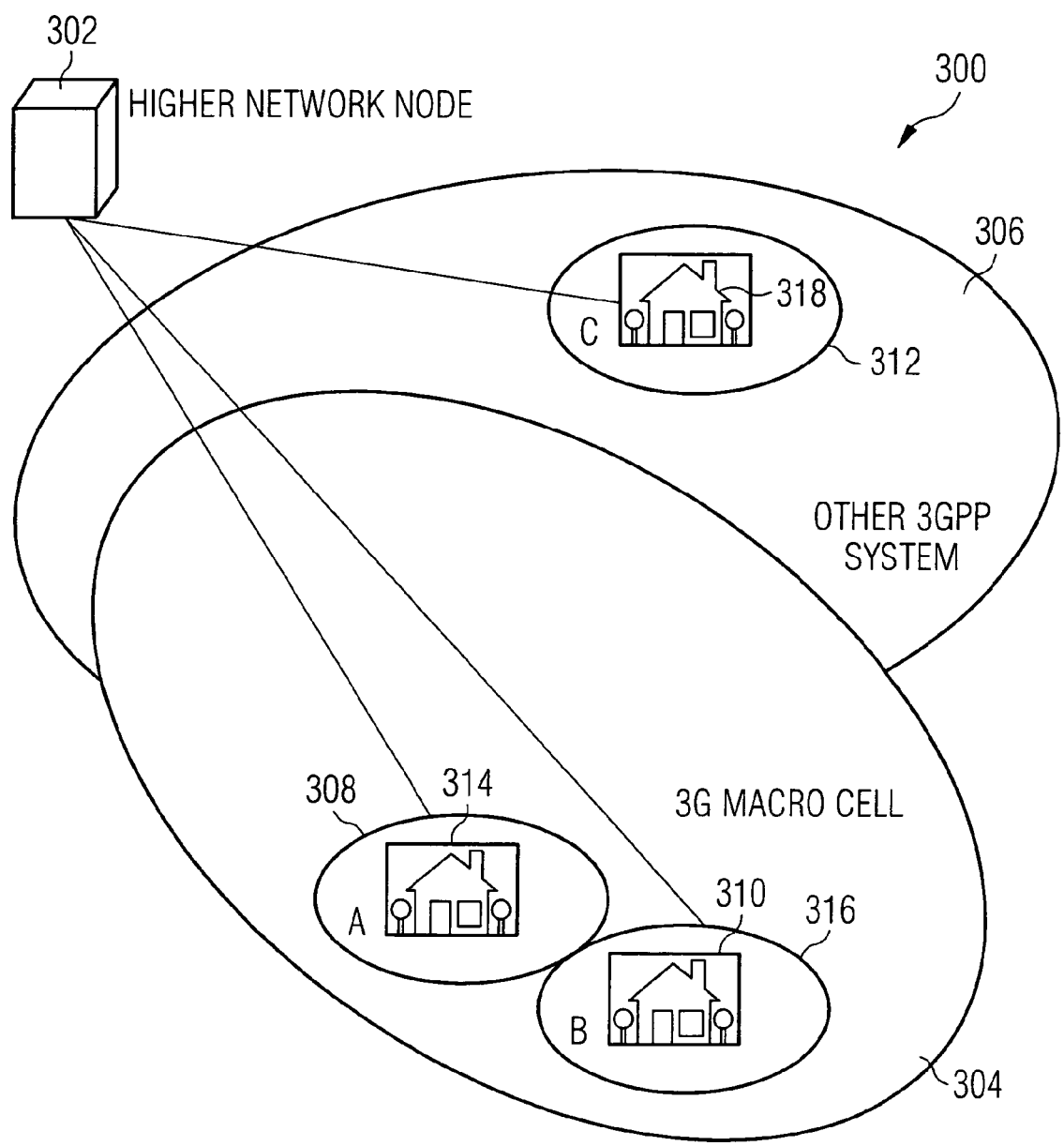
FIG. 3 shows a possible deployment scenario for three Home NodeBs in accordance with an embodiment.

FIG. 3 shows a possible deployment scenario for three Home NodeBs in accordance with an embodiment in an illustration 300.

In this example, a higher network node 302 is shown, which symbolizes all entities of the mobile radio system provided "above" the NodeBs and Home NodeBs. Furthermore, FIG. 3 shows a first mobile radio macro cell 304, provided by a first provider in accordance with a first 3GPP mobile radio communication system, and a second mobile radio macro cell 306, provided by a second provider in accordance with a second 3GPP mobile radio communication system. The first and second providers may be the same provider or different providers. Furthermore, the first and second 3GPP mobile radio communication systems may be the same 3GPP mobile radio communication system or different 3GPP mobile radio communication systems. In an example, the first 3GPP mobile radio communication system may be an LTE mobile radio communication system, and the second 3GPP mobile radio communication system may be a UMTS mobile radio communication system. However, the embodiments are not limited to neither LTE nor UMTS, not even to a 3GPP mobile radio communication system. Any other suitable mobile radio communication system may be used in the context of the described embodiments, e.g. any suitable Licensed Mobile Access mobile radio communication system, such as e.g. a Freedom of Mobile Multimedia Access (FOMA) mobile radio communication system or a Code Division Multiple Access 2000 (CDMA 2000) mobile radio communication system.

As also shown in FIG. 3, in each mobile radio macro cell 304, 306, there may be provided one or more mobile radio micro cells (in the following also referred to as Home NodeB cells) 308, 316, 312, which may be provided by respective Home NodeBs 314, 310, 318. The Home NodeBs 314, 310, 318, may be connected to the respective entities of the higher network node 302 in accordance with the technology provided in the respective mobile radio communication system.

Figure 4:
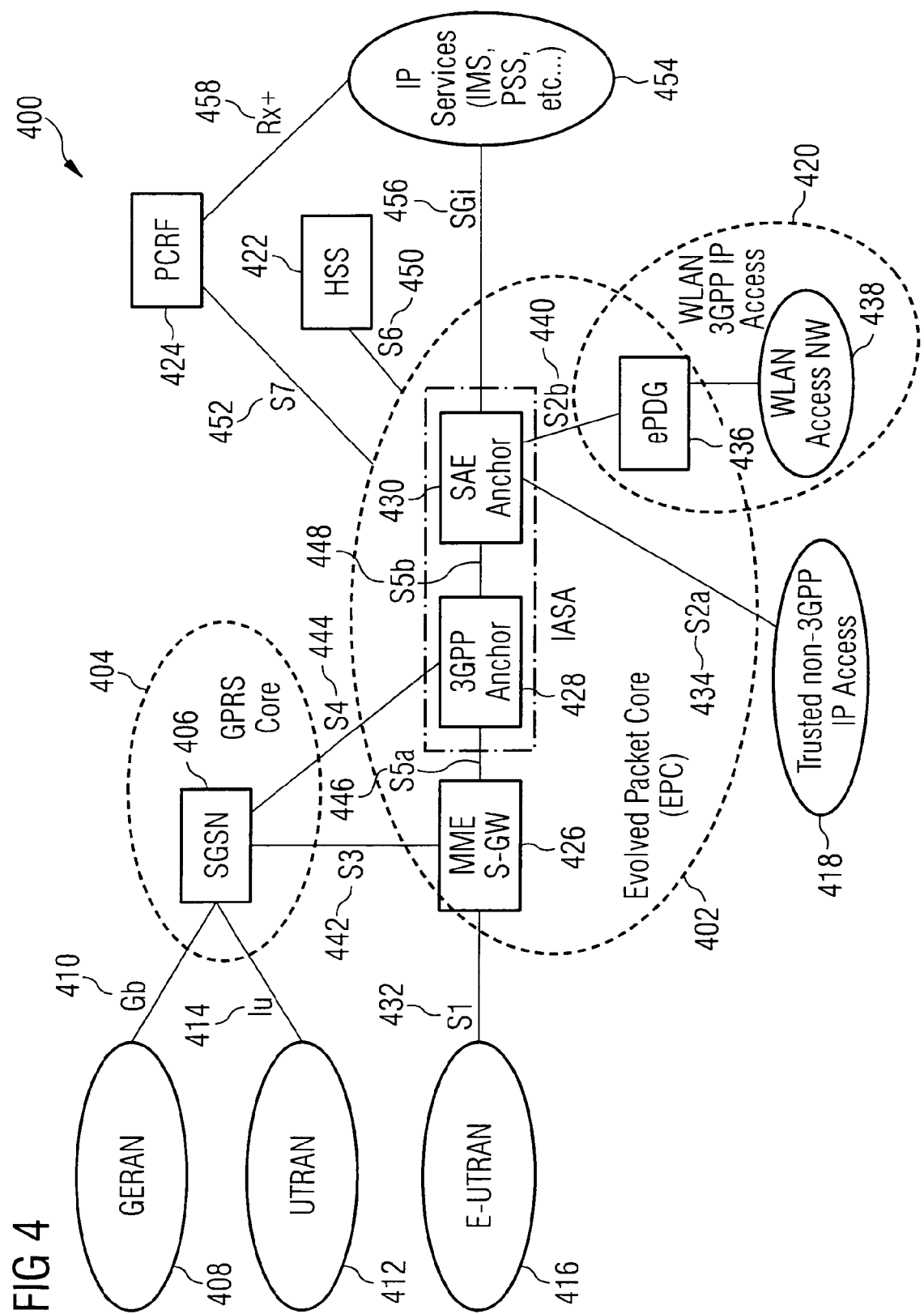
FIG. 4 shows an overview of the general 3GPP Network Architecture with three different Radio Access Networks in accordance with an embodiment.

FIG. 4 shows an overview of a general 3GPP Network Architecture 400 with three different Radio Access Networks (RANs). The 3GPP Network Architecture 400 may include an Evolved Packet Core (EPC) 402 and a General Packet Radio Service (GPRS) Core 404, which may be connected with each other by various interfaces, as will be described in more detail below. As shown in FIG. 4, the GPRS Core 404 may include a Serving GPRS Support Node (SGSN) 406, which may be coupled to different Radio Access Networks, such as e.g. to a GSM EDGE Radio Access Network (GE-RAN) 408 (which may also be referred to as 2G or 2.5G) via a Gb interface 410, and/or to a UMTS Terrestrial Radio Access Network (UTRAN) 412 via an Iu interface 414. In an embodiment, UTRAN stands for UMTS Terrestrial Radio Access Network and is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN may contain at least one NodeB that is connected to at least one Radio Network Controller (RNC). An RNC may provide control functionalities for one or more NodeB(s). A NodeB and an RNC may be the same device, although typical implementations may have a separate RNC located in a central location serving multiple NodeBs. An RNC together with its corresponding NodeBs are called the Radio Network Subsystem (RNS). There may be more than one RNS provided per UTRAN.

Furthermore, in an embodiment, the following entities or components may be provided in the general 3GPP Network Architecture 400:
- an evolved UMTS Terrestrial Radio Access Network (E-UTRAN) 416;
- a trusted non-3GPP Internet Protocol (IP) access network 418 and connected therewith trusted non-3GPP Internet Protocol (IP) devices, in other words, trusted non-3GPP devices which may access the EPC 402 using the Internet Protocol stack;
- a Wireless Local Area network (WLAN) 3GPP Internet Protocol (IP) access network 420 and connected therewith Wireless Local Area network (WLAN) 3GPP Internet Protocol (IP) devices, in other words, WLAN 3GPP devices which may access the EPC 402 using the Internet Protocol stack;
- a Home Subscriber Server (HSS) 422; and
- a Policy and Charging Rules Function (PCRF) entity 424.

E-UTRAN may be understood as being the new 3GPP Radio Access Network for LTE (3.9G) that is currently being worked on. The proposed E-UTRA air interface may use OFDMA for the downlink transmission direction (tower to handset) and Single Carrier FDMA (SC-FDMA) for the uplink transmission direction (handset to tower). It may employ MIMO (Multiple-Input Multiple-Output) with a plurality of antennas, e.g. with up to four antennas per station. The use of OFDM (Orthogonal Frequency Division Multiplexing) may enable E-UTRA to be much more flexible in its use of spectrum than the older CDMA based systems, such as e.g. UTRAN. OFDM has a link spectral efficiency greater than CDMA, and when combined with modulation formats such as 64QAM (Quadrature Amplitude Modulation), and techniques as MIMO, E-UTRA is expected to be considerably more efficient than W-CDMA (Wideband CDMA) with HSDPA (High Speed Downlink Packet Access) and HSUPA (High Speed Uplink Packet Access).

Furthermore, as will be described in more detail below, the EPC 402 may include a Mobility Management Entity (MME) and a Serving Gateway (S-GW) (in FIG. 4 shown as one entity MME S-GW 426; however, the MME and the S-GW may also be implemented in separate devices), a 3GPP Anchor entity 428 and an SAE (System Architecture Evolution) Anchor entity 430.

In an embodiment, the E-UTRAN 416 may be connected to the MME S-GW 426 in the EPC 402 via an S1 interface 432.

Furthermore, the trusted non-3GPP IP entity 418 may be connected to the SAE Anchor entity 430 via an S2a interface 434. In an embodiment, the S2a interface 434 may be based on the Proxy Mobile IPv6 (PMIP) and in order to support accesses that do not support PMIP also Mobile IPv4.

The WLAN entity 420 may include an ePDG (Evolved Packet Data Gateway) 436 and a WLAN access network 438. The ePDG 436 may be connected to the SAE Anchor entity 430 via an S2b interface 440, which may provide the user plane with related control and mobility support between ePDG 436 and a Packet Data Network (PDN) Gateway of the EPC 402. In an embodiment, the S2b interface 440 may be based on the Proxy Mobile IPv6 (PMIP).

Furthermore, the SGSN 406 may be connected to the MME S-GW 426 in the EPC 402 via an S3 interface 442, which may provide and enable a user and bearer information exchange for inter 3GPP access network mobility in idle and/or active state. In an embodiment, the S3 interface 442 may be based on the GPRS tunneling protocol (GTP) and the Gn interface as it may be provided between SGSNs. The SGSN 406 may further be connected to the 3GPP Anchor entity 428 via an S4 interface 444, which may provide the user plane with related control and mobility support between the GPRS Core and the 3GPP Anchor function of the S-GW and may be based on the GTP protocol and the Gn reference point as provided between SGSN and GGSN.

The MME S-GW 426 may be connected to the 3GPP Anchor entity 428 via an S5a interface 446 and the 3GPP Anchor entity 428 may be connected to the SAE Anchor entity 430 via an S5b interface 448.

Furthermore, the HSS 422 may be connected to the EPC 402 via an S6 interface 450, which may provide or enable transfer of subscription and authentication data for authenticating/authorizing user access to the evolved system (AAA interface) between the MME and the HSS 422.

The PCRF 424 may be connected to the EPC 402 via an S7 interface 452, which may provide transfer of Quality of Service (QoS) policy and charging rules from the PCRF 424 to the Policy and Charging Enforcement Function (PCEF) in the PDN Gateway of the EPC 402. In an embodiment, the S7 interface 452 may be based on the Gx interface.

IP services such as e.g. (3G) IP Multimedia Subsystem (IMS), (3G) Packet Switches Streaming (PSS), etc., may be provided via an SGi interface 456 to the SAE Anchor entity 430 and/or via an Rx+ interface 458 to the PCRF 424. In an embodiment, the SGi interface 456 may be the interface between the PDN Gateway and the packet data network. The packet data network may be an operator external public or private packet data network or an intra operator packet data network, e.g. for provision of IP services such as e.g. of IMS. The SGi interface 456 may correspond to the Gi and Wi interfaces and support any 3GPP or non-3 GPP access. The Rx+ interface 458 may correspond to the Rx interface and is the interface between the IP services and the PCRF 424.

In the following embodiment an LTE system (E-UTRAN) supporting the concept of 'Home eNodeBs' is considered. It should be mentioned that the embodiments and examples described herein can easily be adapted to other Radio Access Technologies (RATs), such as UMTS (UTRAN) or GSM (GERAN) in alternative embodiments and examples. In E-UTRAN the eNodeBs are illustratively more intelligent than legacy NodeBs of a UTRAN system, since almost all the RNC functionality has been moved to the eNodeB.

Figure 5:
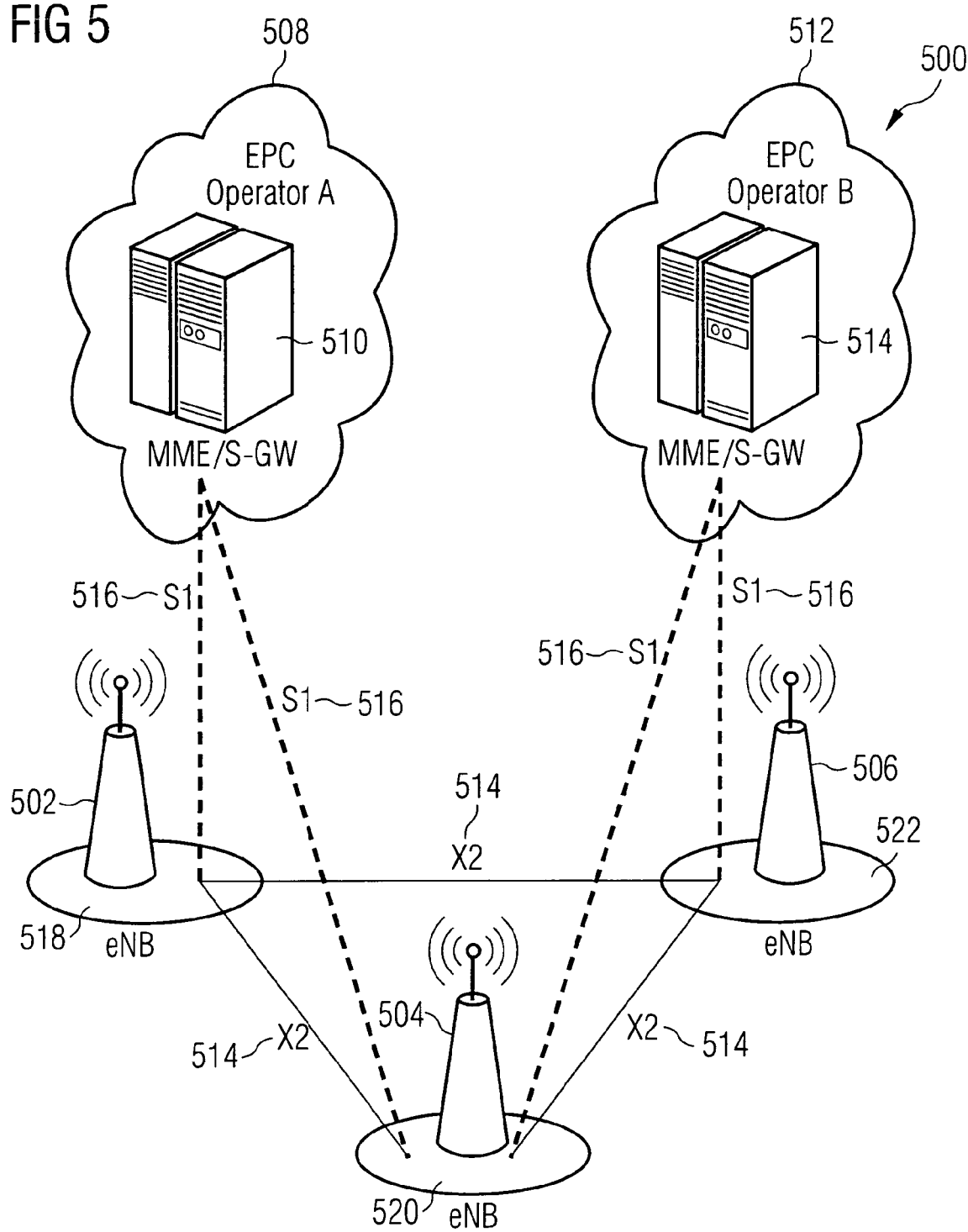
FIG. 5 shows an E-UTRAN architecture in accordance with an embodiment.

FIG. 5 shows an example E-UTRAN architecture 500 including three eNodeBs 502, 504, 506, two Evolved Packet Cores (EPCs), e.g. a first EPC 508, provided by a first operator A and including a first MME/S-GW 510, and a second EPC 512, provided by a second operator B and including a second MME/S-GW 514. In LTE, the eNodeBs 502, 504, 506, are interconnected with each other by means of the X2 interfaces 514. Furthermore eNodeBs 502, 504, 506, are connected by means of the S1 interfaces 516 to the MME/S-GW 510, 514, of the respective EPC 508, 512. The S1 interface 516 as defined by 3GPP may support a many-to-many relation between EPC 508, 512, and eNodeB 502, 504, 506, i.e. theoretically different operators may simultaneously operate the same eNodeB 502, 504, 506. The eNodeBs 502, 504, 506, may provide mobile radio coverage for the radio communication terminal device located in the respective mobile radio cells 518, 520, 522.

As will be described in more detail below, various embodiments may be based on the exchange of control messages between the MNO's Core Network (CN) and the Radio Access Network (RAN), where the 'Home NodeBs' are located.

A Mobile Network Operator (MNO) may be enabled to distribute the radio resources allocated to a 'Home NodeB' dynamically among users of a closed subscriber group and public users (users of a "public subscriber group") that are passing by.

It is to be noted that the Home Gateway Initiative (HGI) is starting to look at the 'Home Base Station' work in 3GPP with rising interest. In the past the HGI's focus has been restricted to gateways between a small, wired in-house network and the Internet without any involvement of a cellular communication network which brings along special cellular requirements. An example of the corresponding network architecture is depicted in FIG. 6 in an illustration 600.

From HGI's point of view the support of all end-user's intra-home network needs (e.g. communication connections 602, 604 and 606 between end-user's communication devices 608, 610, 612, 614, e.g. via a switch device 616 and/or a gateway device 618; these connections 602, 604 and 606 and end-user's communication devices 608, 610, 612, 614 illustratively form a home network 620) are as important as home network external communication connections from end-user's communication devices 608, 610, 612, 614 to Service Edge Nodes 622, 624 (e.g. communication connections 626 and 628 e.g. via the gateway device; the Service Edge Nodes 622, 624 are part of an access network 630).

An end customer product combining the legacy gateway functionality as defined by HGI with the 'Home Base Station' concept developed by 3GPP would hold some challenges related to the RAT as will be explained in the following. In this case there would have to be provided a gateway offering a communication connection to an MNO's core network on the network side (e.g. a broadband connection such as e.g. DSL, cable, fibre) plus one of the well known radio access technologies (RATs) such as e.g. GSM, UMTS, LTE, etc., on the consumer side, which is also used for intra home traffic (e.g. connecting two personal computers (PCs) via Ethernet, exchanging remote control commands between a portable remote control and a media server in the house, allowing for machine to machine communication, etc.). For this in-house data traffic, no further cordless technology shall be required, otherwise it would be necessary to go back towards expensive UMA communication devices.

Figure 6:
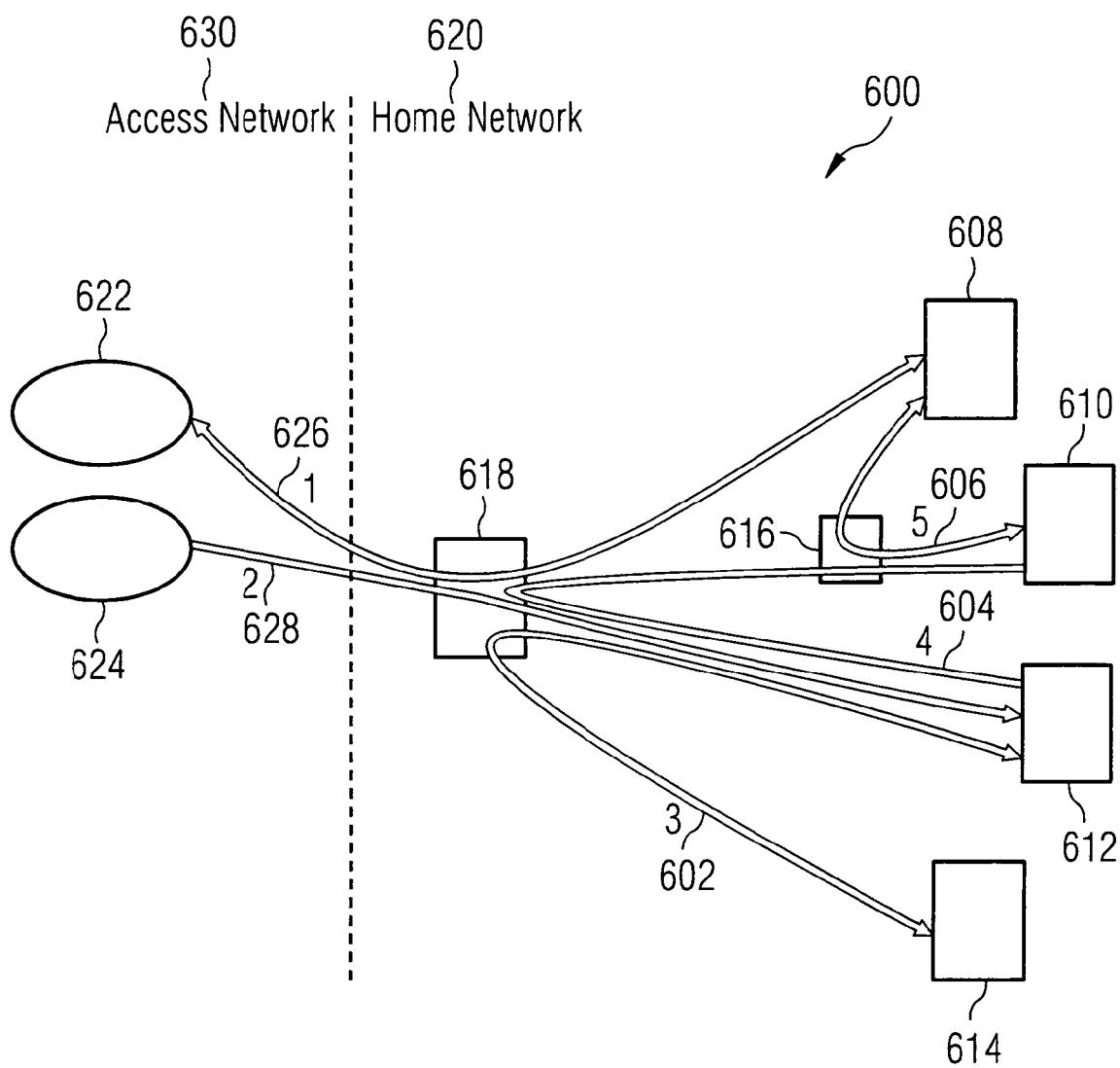
FIG. 6 shows an architecture model from HGI point of view without any involvement of a cellular radio communication network.

When internal traffic (i.e. the intra-home communication connections 602, 604, and 606 shown in FIG. 6 above) is transferred via a RAT operating in licensed frequency bands, the MNO may want to monitor what is going on in the part of the frequency spectrum assigned to him. He may also want to charge the user for internal data traffic (depending on the type of internal data traffic or on the type of communication device). To be able to do this, the MNO needs a secure (trusted) environment to operate in. This may be achieved by mounting either a TPM or a smart card in the 'Home Base Station' in accordance with an implementation of various embodiments, as will be described in more detail below.

Figure 7:
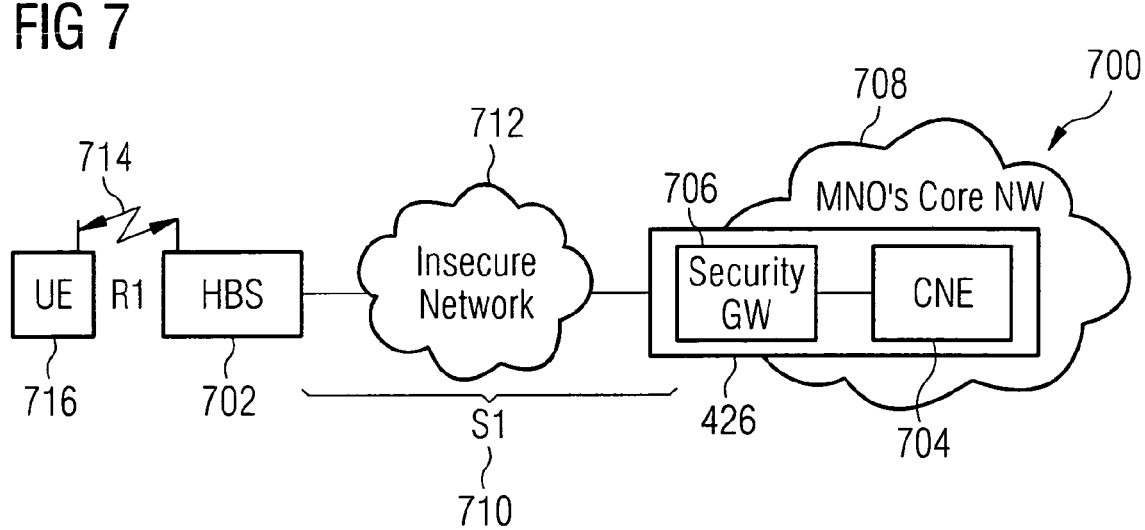
FIG. 7 shows a simplified architecture of a mobile radio communication system in accordance with an embodiment.

FIG. 7 shows a simplified architecture of a mobile radio communication system 700 in accordance with an embodiment.

In accordance with an embodiment, an eNB (which may be understood as the 3GPP terminology for 'Home Base Station' (HBS)) 702 may host a number of different functions, such as functions for Radio Resource Management, Radio Bearer Control, Radio Admission Control, Connection Mobility Control, IP header compression, and encryption of user data stream. A Mobility Management Entity (MME) 704 located in the MNO's core network 708 hosts functions for the distribution of paging messages to the eNBs 702, security control, idle state mobility control, SAE bearer control, ciphering and integrity protection of NAS signaling, while the Serving Gateway (S-GW) which is also located in the MNO's core network 708 hosts functions for switching the U-plane traffic to support UE mobility. The Serving Gateway (S-GW) is not shown in FIG. 7.

In the following examples, the Mobility Management Entity (MME) 704 and the Serving Gateway (S-GW) may be combined for simplicity in a logical entity called Core Network Entity (CNE) as already indicated above.

In various embodiments, the Core Network Entity (CNE) may include all of the MME's 704 and S-GW's functions in their entirety or parts thereof. In another embodiment, the Core Network Entity (CNE) may include even more core network functionalities such as HLR (HLR—Home Location Register) and/or the OCS (OCS—Online Charging System) and/or the BD (BD—Billing Domain), and so on. The Online Charging System (OCS) may be understood as a functional network entity that performs real-time credit control including transaction handling, rating, online correlation and management of subscriber accounts/balances. The Billing Domain (BD) may receive and process charging data records (CDR) files from the various core network charging functions and may provide functions such as billing applications, billing mediation applications or other (e.g. statistical) applications. Contrary to the "Online Charging System" mentioned before, that may be responsible for the equivalent functionality in online charging, the Billing Domain (BD) may only be applicable to offline charging. The 'Home Base Station' (HBS) 702 may be connected via an S1 interface 710 via an insecure network 712 to the Mobile Network Operator's Core Network 708, where the CNE resides. The R1 interface 714 denotes the radio interface (GSM, UMTS, LTE, etc.) between a UE 716 and the 'Home Base Station' 702, which may also be used for intra-home traffic according to various embodiments.

Figure 8:
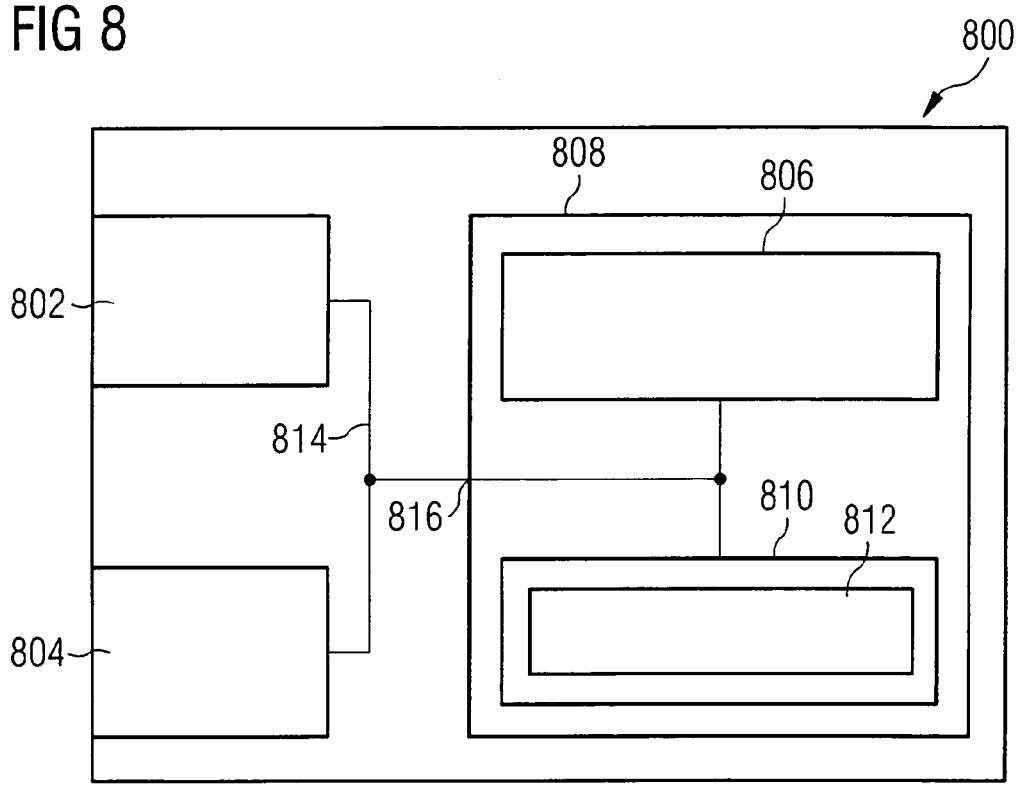
FIG. 8 shows a mobile radio communication device in accordance with an embodiment.

FIG. 8 shows a mobile radio communication device 800 such as e.g. the 'Home Base Station' 702 of FIG. 7 in accordance with an embodiment in more detail.

In an embodiment, the mobile radio communication device 800 may include a mobile radio communication protocol circuit 802 configured to provide a mobile radio base station function for a mobile radio communication with another mobile radio communication device such as e.g. the UE 716. Furthermore, the mobile radio communication device 800 may include a network control interface circuit 804 configured to receive communication control signals from a mobile radio network circuit (e.g. the CNE or the RNC, depending on the mobile radio communication technology used) being controlled by a mobile radio network operator to control the mobile radio communication protocol circuit 802. Moreover, a trusted processing circuit 806 may be included in the mobile radio communication device 800 which may be configured to process a computer program 812 in a trusted processing environment 808 (e.g. implemented by a controller or processor or any other kind of processing logic arranged within the trusted processing environment 808) to provide a trusted processing result, wherein the trusted processing circuit 806 is outside of the mobile radio network operator's domain.

In this context it should be noted that in accordance with this description, the terms "control" and "domain" are not exchangeable. In various embodiments, the term "control" in general is intended to mean e.g. the starting or triggering of an action or process. However, in various embodiments, a domain describes a sphere of influence of a subject or an object with respect to another subject or object, in which the subject or object has complete and direct physical control over the other subject or object. By way of example, in case of a home base station, the same is not under complete and direct physical control of the MNO, but the user of the home base station may e.g. switch the home base station on or off or can even open the device, e.g. in order to insert a smart card or the like or in order to change same operating parameters. Nevertheless, the home base station would be controlled by the network e.g. during a communication connection, e.g. the network may control the frequencies and/or the power that may be used for signal transmission. Furthermore, it is to be noted that a domain in the context of this description is not an internet domain, but a sphere of influence as outlined above.

In an embodiment, the mobile radio communication device 800 may further include a memory (volatile and/or non-volatile) 810, e.g. a read-only memory (ROM) or a random access memory (RAM), in which the computer program to be executed may be stored. The memory 810 may include one or more memories of the same or of different types. The memory 810 or a part of the memory 810 may be provided within the trusted processing environment 808. Alternatively, the memory 810 or a part of the memory 810 may be provided outside the trusted processing environment 808, but within the mobile radio communication device 800.

The respective components of the mobile radio communication device 800 may be connected with each other e.g. by means of electrically conductive lines 814 or cables. The trusted processing result which may be the result of the processing or executing of the computer program 812, may be provided at an interface 816 of the trusted processing environment 808 to e.g. the network control interface circuit 804 or to another interface which will be described in more detail below with respect to an implementation of an embodiment, and via the network control interface circuit 804, e.g. to the core network and thus to the MNO.

The trusted processing environment 808 is configured such that it is trusted by the MNO so that the trusted processing result is a reliable and trustworthy information e.g. for the core network and thus for the MNO, for example. Thus, in an embodiment, it is achieved to provide reliable information for the MNO although the mobile radio communication device 800 (and also the trusted processing environment 808) is out of the domain of the MNO, in other words, out of the physical control of the MNO.

Figure 9:
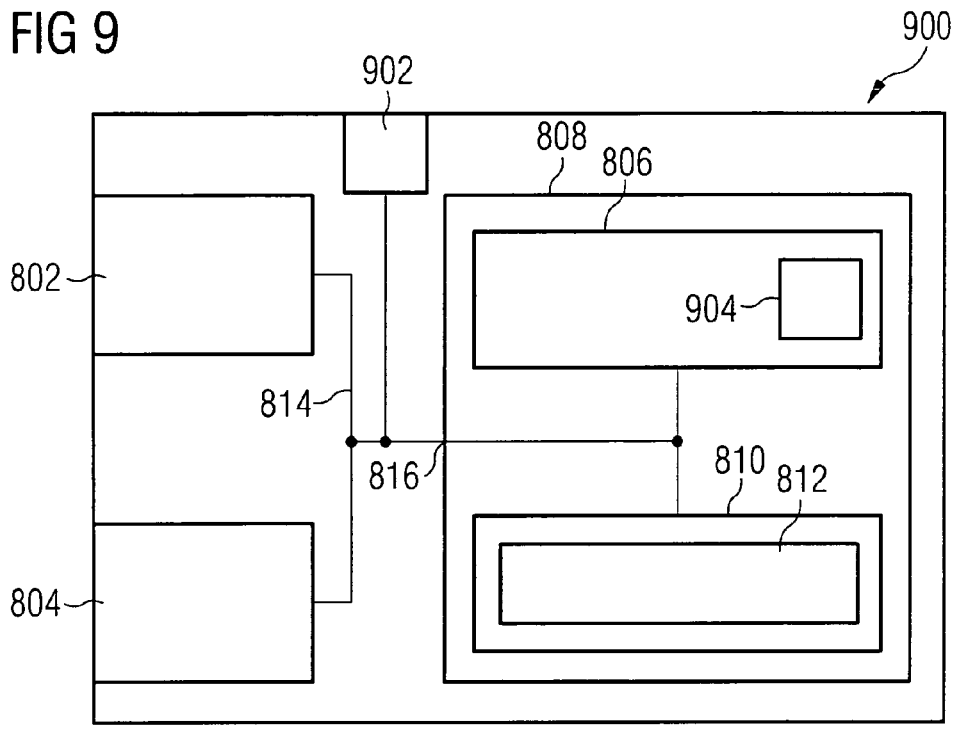
FIG. 9 shows a mobile radio communication device in accordance with another embodiment.

FIG. 9 shows a mobile radio communication device 900 in accordance with another embodiment. The mobile radio communication device 900 of FIG. 9 is similar to the mobile radio communication device 800 of FIG. 8, but further includes additional components, e.g. a user control interface circuit 902 configured to receive control signals from a user of the mobile radio communication device, the user being different from the mobile radio network operator. The user control interface circuit 902 may include one or more switches, sensors, actuators, or controllers, e.g. to switch the mobile radio communication device 900 on or off or to (e.g. manually by the user) change operating parameters such as frequency ranges to be used during the communication connections or to set specific technologies (e.g. also UMA technologies which may be used in different operating modes) to be used for a communication connection using the mobile radio communication device 900.

In an embodiment, the trusted processing circuit 806 may be configured to ensure the trusted processing environment 808 uses a cryptographic service. By way of example, the trusted processing circuit 806 may include a cryptographic circuit 904 configured to provide a cryptographic service, e.g. dependent on the technology used to ensure the trustworthiness of the trusted processing environment 808. The cryptographic service may include one or more cryptographic service of the following cryptographic services: an access control service, an identification service, an attestation service, an authentication service, an encryption service, a decryption service, and/or a digital signature service.

In an embodiment, the cryptographic circuit 904 may include a memory to store cryptographic material such as e.g. cryptographic keys (e.g. a certified public key of the MNO and/or a secret key of one or more users and/or various other public keys). The memory may be part of the memory 810 or a separate memory.

The trusted processing circuit 806 may include a Trusted Platform Module and/or a smart card (such as e.g. a Subscriber Identity Module (SIM) or a UMTS Subscriber Identity Module (USIM)).

The Trusted Platform Module (TPM) may be understood as an integrated circuit module that has been developed as part of the TCG specification (TCG—Trusted Computing Group, formerly known as TCPA) in order to provide a secure environment for personal computers (PCs). It resembles a smart card inseparably mounted on a computation platform. A difference to a smart card is that it is coupled to a system (computation platform) rather than to a user. Other deployment scenarios—apart from personal computers (PCs)—are PDA (personal digital assistants), cellular phones, and also consumer electronics. In the setting of the methods disclosed in the various embodiments, the 'Home Base Station' 702 may be equipped with a TPM or TPM chip. A TPM chip is a passive element. It cannot actively influence neither the bootstrapping process of the system nor any ongoing operation, but it holds a unique identification tag that can be used to identify a system (computation platform) unambiguously. Furthermore, a TPM can generate, use and store a number of different (e.g. cryptographic) keys (e.g., for encryption algorithms or digital signatures). These keys do not need to be used outside the TPM; all computations may be carried out within the trusted domain of the TPM instead. Software attacks are therefore deemed impossible. Also protection from hardware attacks is relatively good (similar to secure smart cards). TPMs are manufactured in a way that physical attacks result inevitably in the destruction of all data. Some functionalities of a TPM in the context of various embodiments include the capabilities of attestation, certification, and authentication. With the attestation function a remote entity can be convinced about the support of certain functionalities by the system in question, and about the fact that the system itself is in a well-defined state. To put it another way: a computing platform with integrated TPM can proof its trustworthiness towards a remote entity. In many cases, the operational state of a system (computation platform) successfully verified by a TPM's supervision function is a precondition to execute software or to run certain applications.

Figure 10:
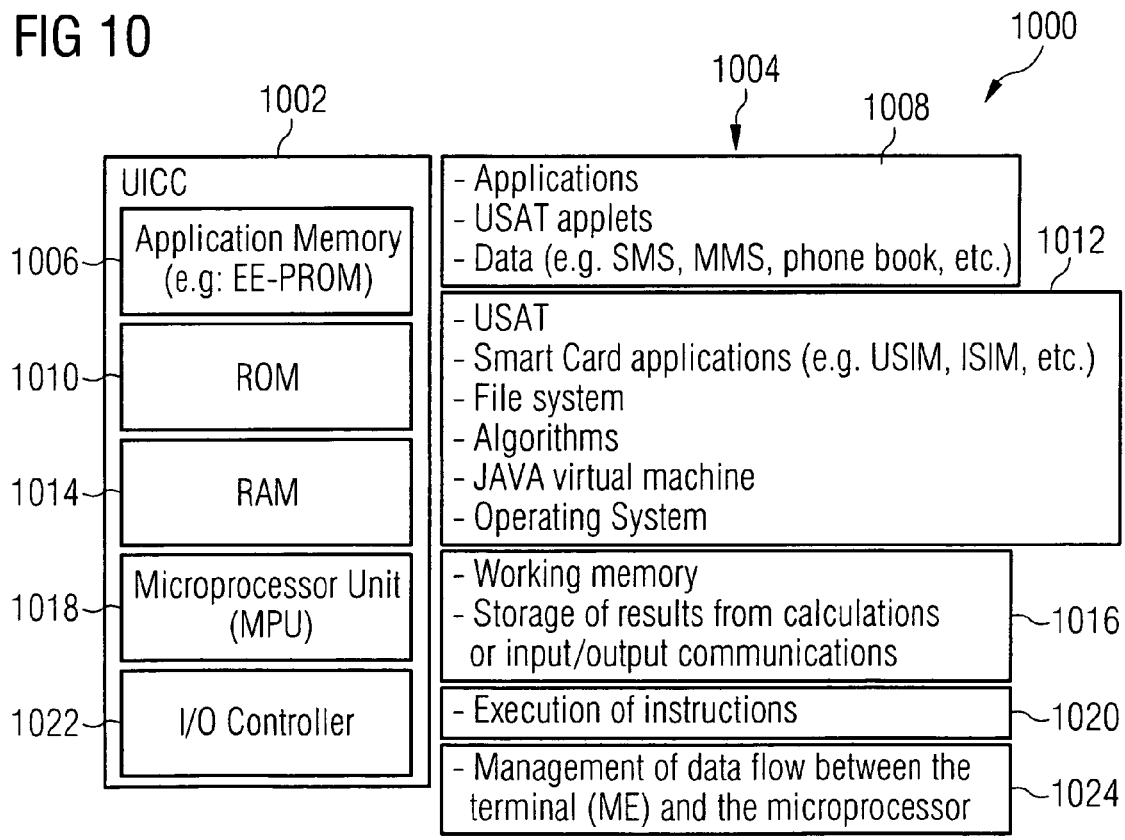
FIG. 10 shows a smart card in accordance with an embodiment.

FIG. 10 shows a smart card 1002 (e.g. a Universal Integrated Circuit Card (UICC)) and the content and functionality 1004 of its main components in accordance with an embodiment in an illustration 1000.

Mobile phones operating according to the GSM standard require a SIM Card for usage in the mobile network, whereas mobile phones operating according to the UMTS standard require a UICC (UICC—Universal Integrated Circuit Card) with at least one USIM (Universal Subscriber Identity Module). Both type of cards (SIM Card and UICC) offer storage capability for applications and application data in their application memory. Most of these applications are mobile communication specific and thus are issued, maintained, and updated by the MNO. Trustworthy applications, that are relevant for this invention report, may also be stored in the application memory of a smart card.

FIG. 10 gives an overview of five architecture elements of the smart card (for example a UICC) 1002. These are as follows:
- an application memory 1006, e.g. implemented as a programmable read only memory (PROM), e.g. as an erasable programmable read only memory (EPROM), e.g. as an electrically erasable programmable read only memory (EEPROM); the application memory 1006 may store application programs (computer programs in general), USIM application toolkit (USAT) applets, and/or data (e.g. short message service (SMS) data, multimedia message service (MMS) data, phone book data, etc. (see e.g. block 1008 in FIG. 10);
- a read only memory (ROM) 1010; the ROM 1010 may be provided to store the USIM application toolkit (USAT), smart card application programs (e.g. USIM, ISIM, etc.), a file system, various algorithms, a JAVA virtual machine, one or more operating systems (see e.g. block 1012 in FIG. 10);
- random access memory (RAM) 1014; the RAM 1014 may be provided as a working memory to store e.g. results from calculations or input/output communication (see e.g. block 1016 in FIG. 10);
- a microprocessor unit (MPU) 1018; the MPU 1018 may be provided for the execution of instructions, in other words, of the respective computer programs mentioned above (see e.g. block 1020 in FIG. 10); and
- an input/output controller (I/O controller) 1022; the I/O controller 1022 may be provided for the management of data flow between e.g. the terminal communication device such as e.g. the mobile equipment (ME) and the MPU 1018 (see e.g. block 1024 in FIG. 10).

In a mobile communication system operating according to the GSM standard, for example, the SIM Card and the Mobile Equipment (ME) together form a Mobile Station (MS), whereas in a mobile communication system operating according to the UMTS standard, the UICC (in the ROM of which multiple SIM and USIM may reside) and the Mobile Equipment (ME) together form a User Equipment (UE).

Figure 11:
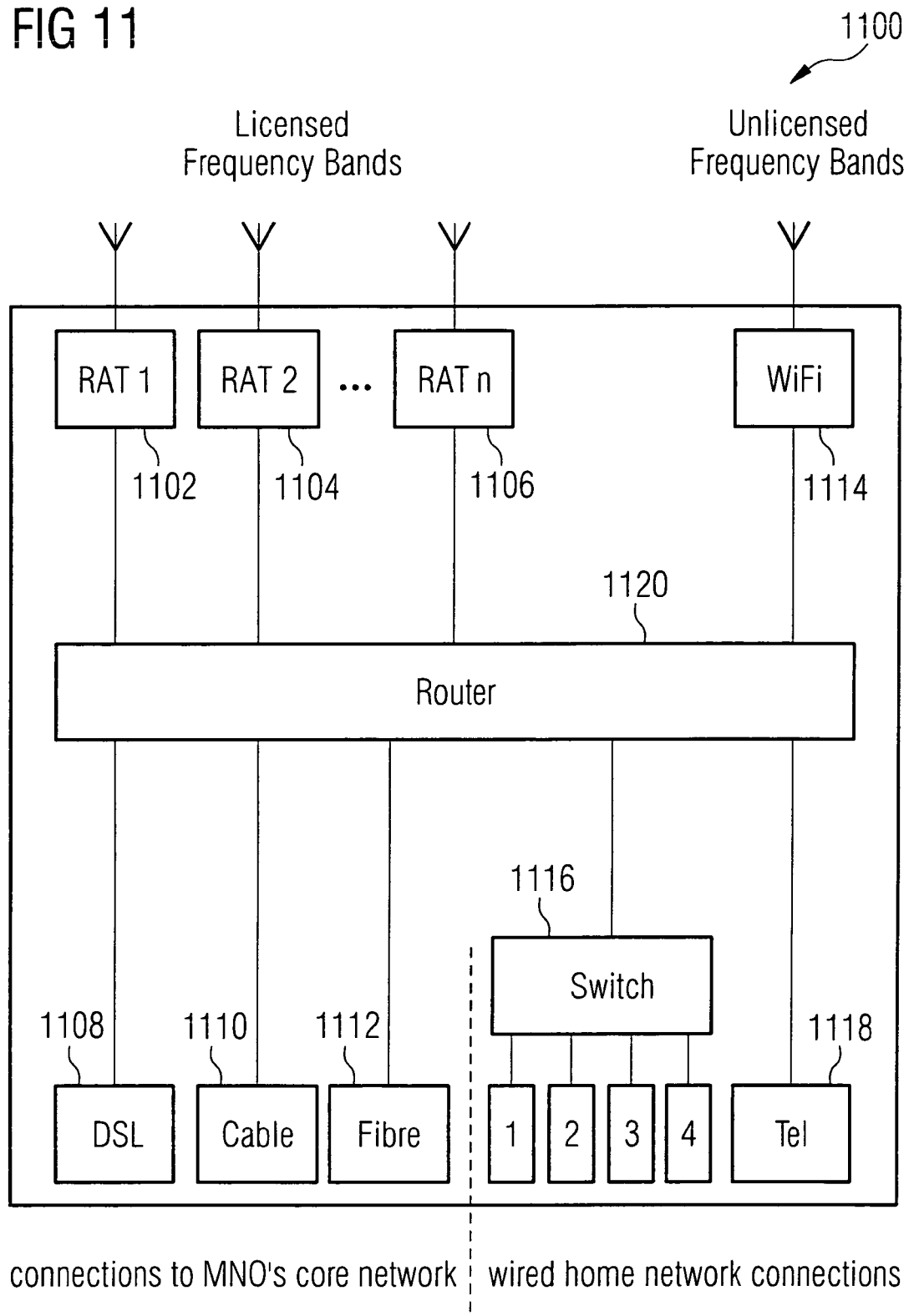
FIG. 11 shows a mobile radio communication device in accordance with yet another embodiment.

FIG. 11 shows a mobile radio communication device 1100 such as e.g. the 'Home Base Station' 702 of FIG. 7 in accordance with another embodiment in more detail.

FIG. 11 shows a 'Home Base Station' 1100 that is combining the legacy gateway functionality as defined by HGI with the 'Home Base Station' concept developed by 3GPP.

The 'Home Base Station' 1100 may include one or a plurality of n mobile radio access technology circuits (RAT 1, RAT 2, . . . , RAT n) 1102, 1104, 1106 implementing the respectively provided radio access technologies in licensed frequency bands. The different mobile radio access technology circuits 1102, 1104, 1106 may be configured in accordance with a mobile radio access technology selected from a group of mobile radio access technologies consisting of: a Universal Mobile Telecommunications System (UMTS) mobile radio access technology, a Long Term Evolution (LTE) mobile radio access technology, a Code Division Multiple Access (CDMA) mobile radio access technology, a Code Division Multiple Access 2000 (CDMA 2000) mobile radio access technology, a Freedom of Mobile Multimedia Access (FOMA) mobile radio access technology, a Global System for Mobile Communications (GSM) mobile radio access technology, and an Enhanced Data rates for GSM Evolution (EDGE) mobile radio access technology.

Connections to the MNO's core network may be achieved by means of additionally provided broadband communication connection interfaces 1108, 1110, 1112 configured to connect to a mobile radio network controlled by the mobile radio network operator. In an embodiment, the broadband communication connection interfaces may be configured as wireline broadband communication connection interfaces. In an embodiment, the broadband communication connection interfaces may be configured in accordance with a broadband communication connection interface selected from a group of broadband communication connection interfaces consisting of: a Digital Subscriber Line (DSL) broadband communication connection interface 1108, a Cable-based broadband communication connection interface 1110, and a Fibre-based broadband communication connection interface 1112. In an embodiment, a traffic measurement circuit may be provided and assigned to the broadband communication connection interface. Furthermore, a plurality of broadband communication connection interfaces may be provided which may be configured to connect to at least one of a mobile radio network controlled by the mobile radio network operator or the Internet. In another embodiment, a plurality of traffic measurement circuits may be provided and assigned to the broadband communication connection interfaces (e.g. one or more traffic measurement circuits may be assigned to each broadband communication connection interface) in order to distinguish Internet traffic from mobile radio network related traffic.

Furthermore, the 'Home Base Station' 1100 may include one or a plurality of unlicensed frequency radio communication protocol circuits 1114 configured to provide a radio transmission for a radio communication with another radio communication device using an unlicensed frequency range. The unlicensed frequency radio communication protocol circuit 1114 may be configured to provide a radio signal transmission in accordance with a predefined radio technology using an unlicensed frequency range. In an embodiment, the unlicensed frequency radio communication protocol circuit 1114 is configured in accordance with a radio technology selected from a group of radio technologies consisting of: a Wireless Local Area Network in accordance with an IEEE 802.11 standard, and a Worldwide Interoperability for Microwave Access technology.

Furthermore, the 'Home Base Station' 1100 may include one or a plurality of wireline communication protocol circuits 1116, 1118 configured to provide a wireline transmission for a communication with another communication device. The wireline communication protocol circuits 1116, 1118 may be configured to provide a signal transmission in accordance with a predefined wireline technology. Furthermore, the wireline communication protocol circuits may be configured in accordance with a wireline technology selected from a group of wireline technologies consisting of: an Ethernet technology (such as e.g. the wireline communication protocol circuit 1116 implemented as an ethernet switch 1116 having four ports 1, 2, 3, 4), and a Public Switched Telephone Network (PSTN) technology (such as e.g. wireline communication protocol circuit 1118).

Data traffic routing may be controlled by a central building block 1120 denominated as a 'Router' 1120 that may be connected to the various different RATs (e.g., GSM, UMTS, LTE, etc.) operating in licensed frequency bands or to the various different wireless technologies (e.g., Wireless LAN according to IEEE 802.11) operating in unlicensed frequency bands. This building block 1120 may also decide to route data traffic over some wired connections, such as the Ethernet connections (represented in FIG. 11 by the Ethernet Switch 1116 with four ports) or legacy telephony lines.

One new challenge with respect to the operation of 'Home Base Stations' could be the handling of intra-home data traffic (in general, of data traffic not being sent via the core network) on licensed frequency bands. Methods for continuously monitoring both internal and external data traffic in 'Home Base Stations' aiming at gathering precise user statistics are not provided in the conventional 'Home Base Stations'. Furthermore, methods for an MNO to monitor execution of configuration changes (e.g., related to software defined radio issues) are not provided in the conventional 'Home Base Stations' either. For an MNO, it would be highly desirable to have means to monitor in detail what is going on in a 'Home Base Station' out in the field that is connected to his core network. He may want to create some statistics to better understand his customers' usage patterns and he may even want to charge for internal data traffic of the 'Home Base Station' if this is sent in the licensed frequency bands that are assigned to him. In general, the MNO might have a need in getting trustworthy information from the 'Home Base Station', although the 'Home Base Station' is not in his or her domain. In addition to e.g. accurate accounting, which will be described in various embodiments in more detail below, other embodiments are provided in accordance with which Charging Data Records (CDRs) may be created for more accurate billing in a trusted environment in the 'Home Base Station' (or it helps to prepare charging related information for Charging Data Record (CDR) generation in the core network, respectively). This need is met by providing a trusted processing environment in a 'Home Base Station', so that trusted processing results may be requested by and provided for the MNO, for example, although the 'Home Base Station' is not within his or her domain.

A Charging Data Record (CDR) as used in the description may represent a formatted collection of information about a chargeable event (e.g. time of communication connection set-up, duration of a call, amount of data transferred, type of data transferred, etc.) for use in billing and accounting. One or more CDR(s) may be generated for a single chargeable event, for example, because of its long duration or its varying characteristics over time.

As will be described in various examples of embodiments in more detail below, one or more of the following functional building blocks (e.g. in the form of one or more circuits or one or more controllers) may be integrated into a 'Home Base Station' to enable the MNO to efficiently monitor both data traffic and configuration changes, for example:

at least one Traffic Measurement Unit (TMU) to monitor the amount and/or type of data for a particular logical and/or physical mobile radio communication device internal interface and/or mobile radio communication device external network interface; a mobile radio communication device internal interface may be an interface between circuits or modules (in general, entities) within the mobile radio communication device; a mobile radio communication device external network interface may be an interface between a circuit or module (in general, entity) of the mobile radio communication device and a circuit or module (in general, entity) outside the mobile radio communication device; a mobile radio communication device external network interface may be of a first type of external interface of the mobile radio communication device for communication with another mobile radio communication device (e.g. a mobile radio communication terminal device such as e.g. a UE) or of a second type of external interface of the mobile radio communication device for communication with the mobile radio network circuit;

an Accounting Module (AM) to systematically record, analyze, and report all data traffic originating and/or terminating in the coverage of a 'Home Base Station' including intra-home traffic, e.g. used to distribute audio/video files within a home communication network provided by the 'Home Base Station';

a Reconfiguration Monitoring Module (RMM) to systematically record, analyze, and report configuration changes, such as firmware updates or radio resource reconfiguration commands received from the communication network, e.g. the core network;

a Billing Module (BM) for collection of data relevant for charging; this may include CDR (Charging Data Record) generation in the 'Home Base Station' or preparation of charging data for CDR generation in the core network;

a Trusted Platform Module (TPM) or Smart Card (SC) creating a trusted processing environment for e.g. at least one of the other functional building blocks listed above to operate in, in other words, to be processed or executed in.

As will also be described in more detail below, various embodiments may include one or more of the following features:

the measurement of traffic data e.g. by means of Traffic Measurement Units (TMUs), which may be implemented by means of one or more circuits or one or more controllers, for example; and/or the collection and analysis of traffic data e.g. by means of an Accounting Module (AM) in a secure, in other words trusted, environment; and/or the collection and analysis of data related to software updates and configuration changes e.g. by means of a Reconfiguration Monitoring Module (RMM) in a secure environment; and/or the preparation of said data for statistical and charging purposes in a secure environment created by a Trusted Platform Module (TPM) or Smart Card (SC) residing in the 'Home Base Station'; and/or the secure exchange of charging related information or information needed for statistical analysis between the 'Home Base Station' and the MNO's core network.

Figure 12:
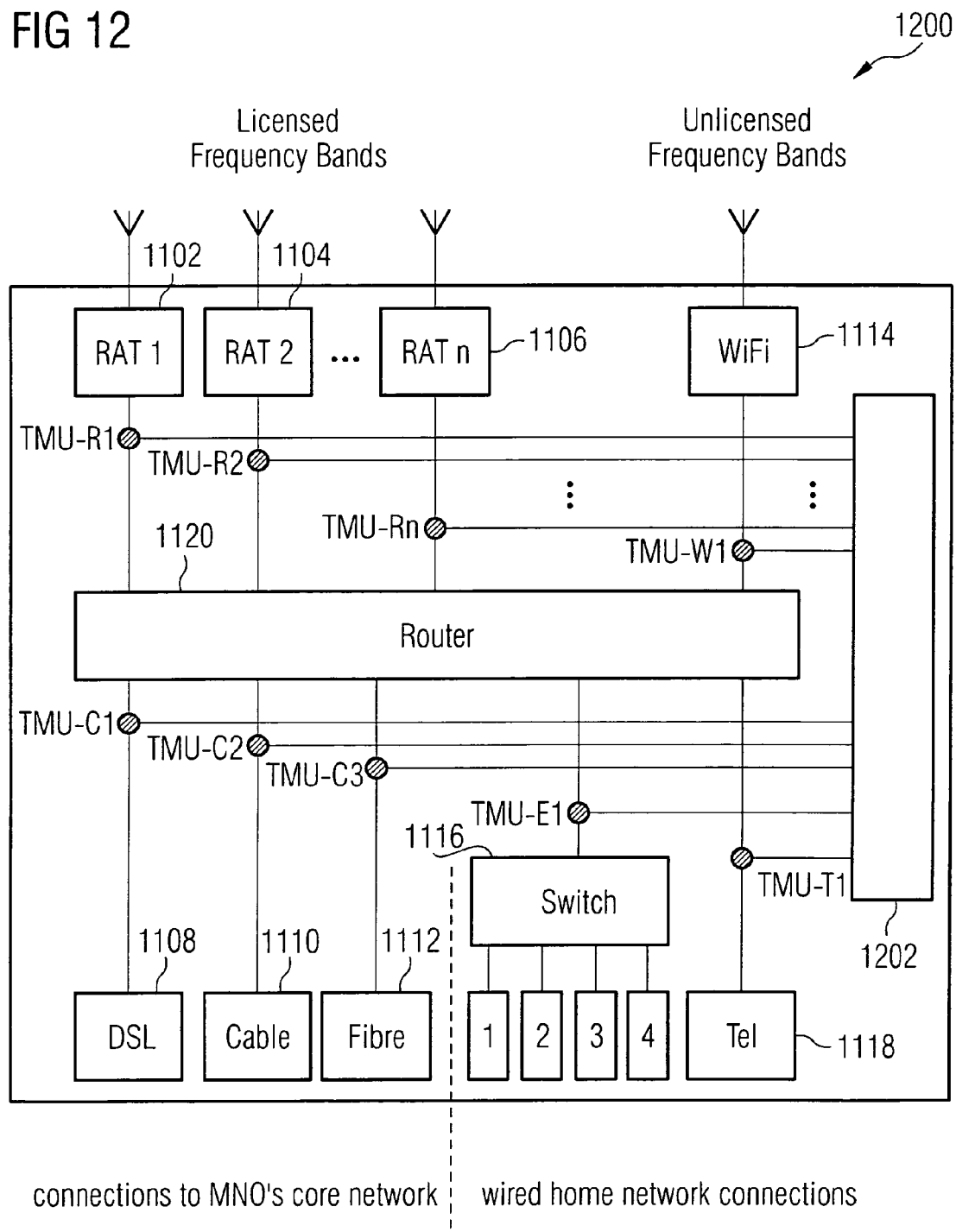
FIG. 12 shows a mobile radio communication device in accordance with yet another embodiment.

FIG. 12 shows a mobile radio communication device 1200 such as e.g. the 'Home Base Station' 702 of FIG. 7 in accordance with another embodiment in more detail. The mobile radio communication device 1200 of FIG. 12 is similar to the mobile radio communication device 1100 of FIG. 11 and has some additional entities (which may be implemented in the form of one or more modules or circuits or controllers). The additional entities may be provided for various accounting methods in accordance with various embodiments, as will be described in more detail below.

For the monitoring of data traffic according to this example, Traffic Measurement Units (TMU) are placed on every interface of interest. The interface in question can be of one of the following categories: internal, external, logical, or physical. The Traffic Measurement Units (TMU) may be located at the beginning or end of an interface. It is even possible to integrate a TMU in one of the other building blocks (e.g., in a RAT box or in the Router box). In the example shown in FIG. 12, an RAT Traffic Measurement Unit TMU-R1, TMU-R2, . . . , TMU-Rn may be provided for each mobile radio access technology circuit (RAT 1, RAT 2, . . . , RAT n) 1102, 1104, 1106 and the corresponding communication interface. Furthermore, a broadband Traffic Measurement Unit TMU-C1, TMU-C2, TMU-C3 may be provided for each broadband communication connection interface 1108, 1110, 1112. Moreover, an unlicensed Traffic Measurement Unit TMU-W1 may be provided for each unlicensed frequency radio communication protocol circuit 1114, an Ethernet Traffic Measurement Unit TMU-E1 may be provided for each ethernet switch 1116 and the corresponding communication interface, and a PSTN Traffic Measurement Unit TMU-T1 may be provided for each PSTN wireline communication protocol circuit 1118 and the corresponding communication interface.

All relevant data collected by the various Traffic Measurement Units (TMU) distributed throughout the system are recorded and analyzed by a central Accounting Module (AM) 1202 in order to systematically report the amount and type of all data traffic originating and/or terminating in the coverage of a 'Home Base Station' (including intra-home traffic) to a Billing Module (BM), which is also located inside the 'Home Base Station' as a new functional building block. For this purpose, the various TMUs may be connected to the central Accounting Module (AM) 1202. In case the Router 1120 holds some TMUs, the Router 1120 may also be connected to the Accounting Module (AM) 1202. The Billing Module (BM) will be described in more detail below. Illustratively, the Accounting Module (AM) 1202 may be configured to provide information about data traffic in the domain of the mobile radio communication device to the mobile radio network circuit.

In another embodiment, the various Traffic Measurement Units (TMU) may collect data required to perform statistical calculations and may report it to an entity which is responsible for statistics with respect to customer usage patterns (e.g. to an entity located in the core network).

Although in accordance with some embodiments, collecting charging related data and CDR preparation/generation is described, it is to be noted that also e.g. the collection of statistical data may be provided in an alternative embodiment, in general, any kind of processing of a computer program in a manner trusted by the MNO or a third party trusting the MNO may be provided. Consequently, the embodiments including collecting charging related data and CDR preparation/generation can be easily extended to cover also the statistics embodiments.

FIG. 12 gives an overview of a 'Home Base Station' with a number of different Traffic Measurement Units (TMUs) and the Accounting Module (AU) 1202 according to an embodiment. The Traffic Measurement Units TMU-R1 to TMU-Rn are configured to monitor data traffic originating from or terminating in the various RATs operating in licensed frequency bands. The Traffic Measurement Unit TMU-W1 is configured to monitor data traffic from/to a wireless module operating in the unlicensed frequency spectrum accordingly. The Traffic Measurement Units TMU-C1 to TMU-C3 are configured to monitor data traffic originating from or terminating in the mobile network operator's core network or (in case of local breakout) the Internet. Local breakout may mean a portion of the DSL/cable/fibre traffic does not require to go through the mobile network operator's core network, which is for example the case for normal web browsing. In an embodiment, it may be provided that one of the Traffic Measurement Units (TMUs) is located at the outbound DSL/cable/fibre ports (interfaces) in order to distinguish local breakout data traffic from the data traffic that is required to go through the mobile network operator's core network. The Traffic Measurement Units TMU-C1 to TMU-C3 in FIG. 12 could be used for exactly this purpose. The Traffic Measurement Units TMU-E1 and TMU-T1 are configured to monitor data traffic over some wired connections, such as Ethernet connections (represented in FIG. 12 by the Ethernet Switch 1116 with four ports 1, 2, 3, 4) or legacy telephony lines. In other words the different TMUs that may be distributed throughout the entire 'Home Base Station' 1200 in FIG. 12 have a similar functionality as so-called Charging Trigger Functions (CTFs) defined by 3GPP. The difference may be seen in that the TMUs are not located in the mobile network operator's domain.

The various Traffic Measurement Units (TMUs) may offer functionality similar to the CTF (Charging Trigger Function) that is defined by 3GPP. Each of them may act as a focal point for collecting information pertaining to chargeable events for a particular system interface, for assembling this information into matching charging events, and for sending these charging events towards the central Accounting Module (AM) 1202, which in turn resembles the CDF (Charging Data Function) that is also defined by 3GPP and which uses the information contained in the charging events to construct CDRs in the mobile network operator's core network. A difference, however, is that in these embodiments, the various TMUs that may be distributed throughout the entire 'Home Base Station' 1200, and the centrally located AM 1202 are not in the mobile network operator's domain, but residing in a consumer premises equipment (CPE), which is physically under the control of the customer and therefore a special handling is provided as far as accounting and the collection of charging relevant data is concerned. Otherwise, the collection of said data could not be deemed reliable, nor could the content of said data be deemed trustworthy.

Figure 13:
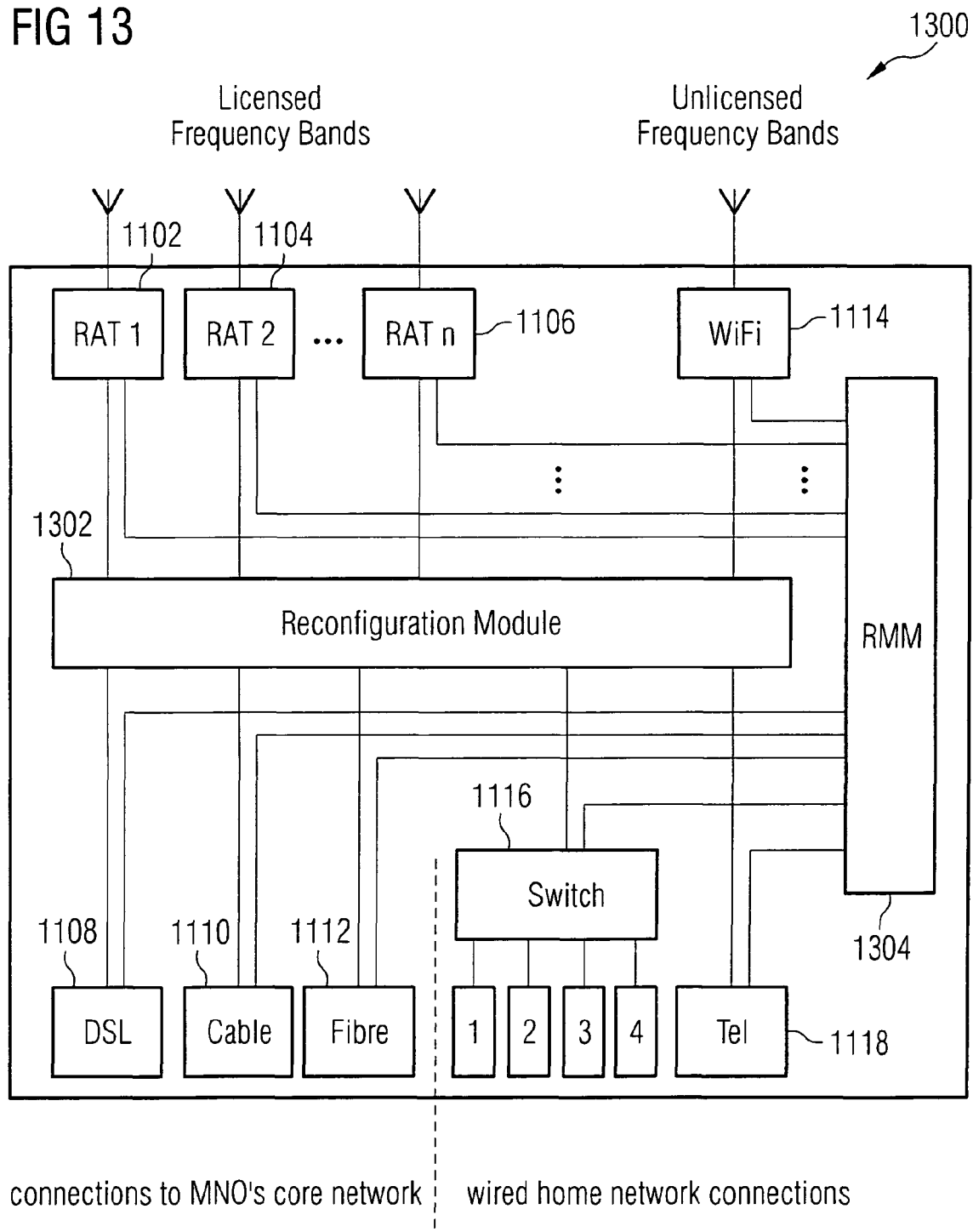
FIG. 13 shows a mobile radio communication device in accordance with yet another embodiment.

FIG. 13 shows a mobile radio communication device 1300 such as e.g. the 'Home Base Station' 702 of FIG. 7 in accordance with another embodiment in more detail. The mobile radio communication device 1300 of FIG. 13 is similar to the mobile radio communication device 1100 of FIG. 11 and has some additional entities (which may be implemented in the form of one or more modules or circuits or controllers) and some modifications. The additional or modified entities may be provided for various accounting methods in accordance with various embodiments, as will be described in more detail below.

The mobile radio communication device 1300 of FIG. 13 may include a reconfiguration module 1302 and a reconfiguration monitoring module (RMM) 1304. In an embodiment, the reconfiguration module 1302 may be configured to perform and control software updates and configuration changes within the mobile radio communication device 1300, and the reconfiguration monitoring module (RMM) 1304 may be configured to monitor and, if desired, analyze the software updates and configuration changes within the mobile radio communication device 1300.

For the collection and analysis of data related to software updates and configuration changes, the reconfiguration monitoring module (RMM) 1304 may be located inside the 'Home Base Station' 1300 in order to systematically report any data e.g. relevant to the charging of software updates or configuration changes to a Billing Module (BM), which may also be located inside the 'Home Base Station' 1300 as a new functional building block in accordance with an embodiment. For this purpose, all the relevant building blocks in which the reconfiguration module 1302 may perform software updates and/or configuration changes may be connected to the reconfiguration monitoring module (RMM) 1304.

Figure 14:
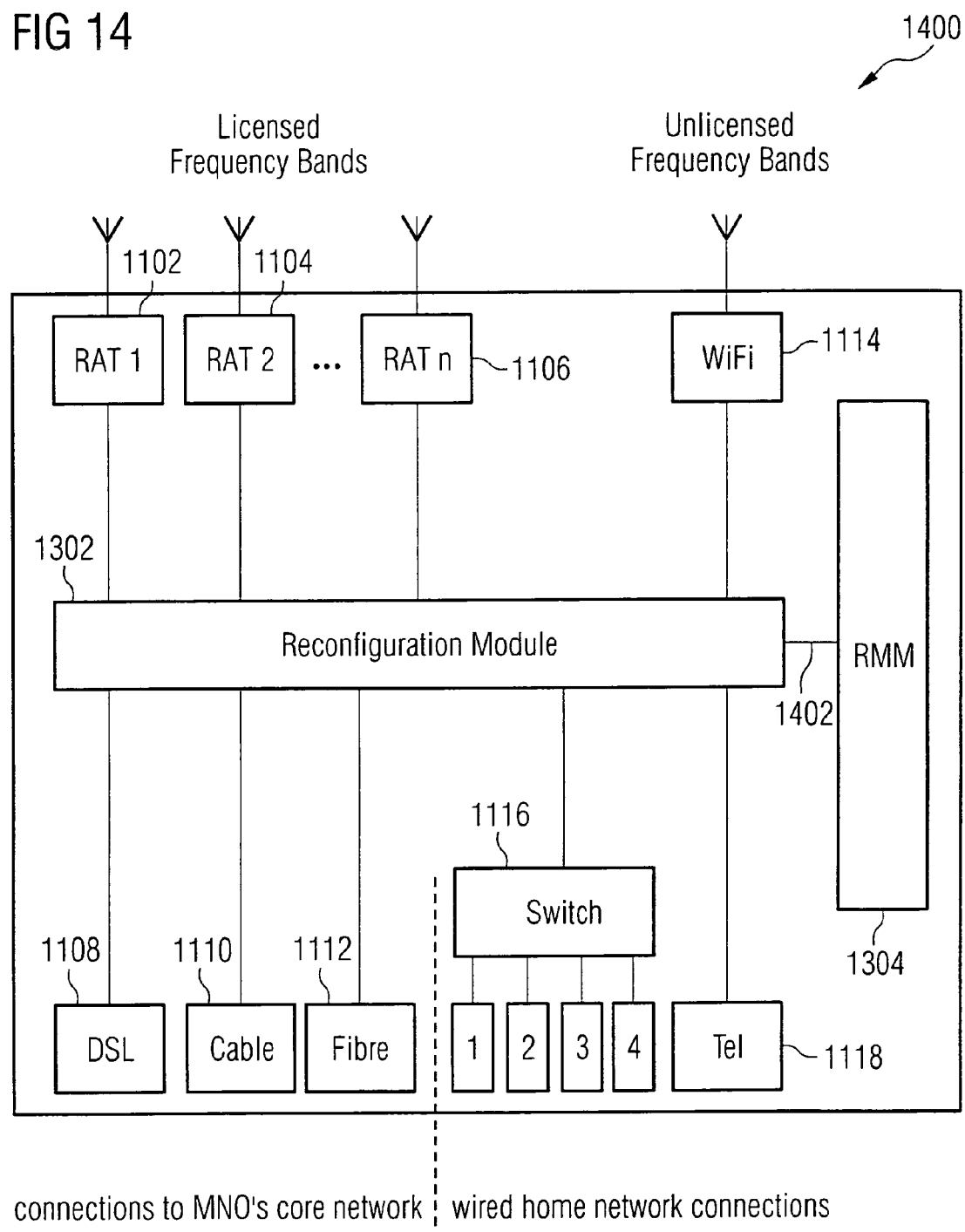
FIG. 14 shows a mobile radio communication device in accordance with yet another embodiment.

FIG. 14 shows a mobile radio communication device 1400 such as e.g. the 'Home Base Station' 702 of FIG. 7 in accordance with another embodiment in more detail. The mobile radio communication device 1400 of FIG. 14 is similar to the mobile radio communication device 1300 of FIG. 13, however, in accordance with the mobile radio communication device 1400 of FIG. 14, the reconfiguration module 1302 is coupled directly with the reconfiguration monitoring module (RMM) 1304 via a connection 1402.

Also combinations of the mobile radio communication device 1300 of FIG. 13 and the mobile radio communication device of FIG. 14 are possible, i.e. some of the relevant building blocks may be connected to the reconfiguration monitoring module (RMM) 1304, while for other relevant building blocks the reconfiguration monitoring module (RMM) 1304 receives the relevant information directly from the reconfiguration module 1302. The billing module (BM) will be described in detail further below.

Figure 15:
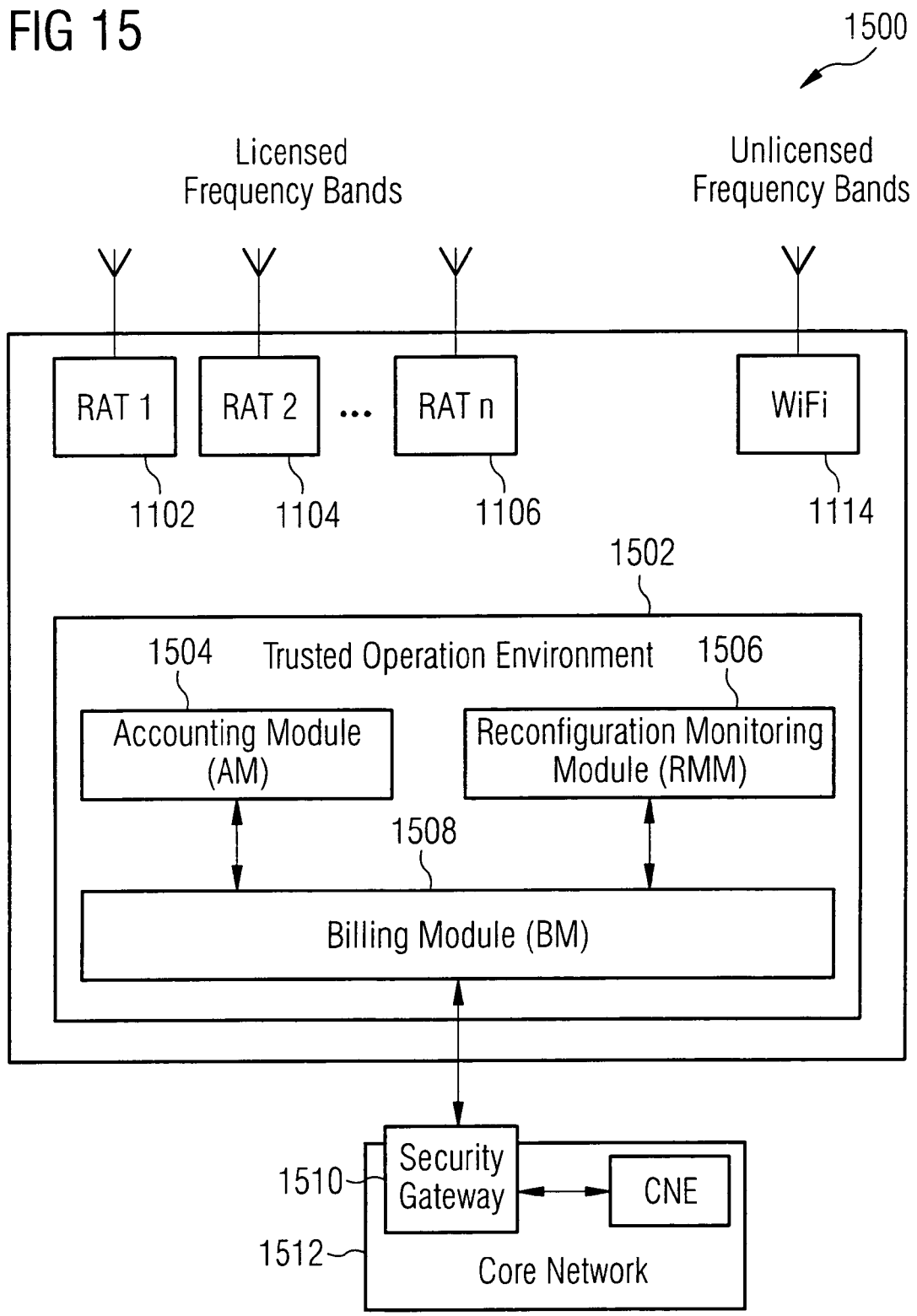
FIG. 15 shows a mobile radio communication device in accordance with yet another embodiment.

FIG. 15 shows a mobile radio communication device 1500 such as e.g. the 'Home Base Station' 702 of FIG. 7 in accordance with another embodiment in more detail.

In this embodiment, the mobile radio communication device 1500 is configured as a 'Home Base Station' offering a Trusted Operation Environment (also referred to as trusted processing environment) 1502 for the accounting module (AM) 1504, the reconfiguration monitoring module (RMM) 1506, and the billing module (BM) 1508 to operate in, in other words, to be processed or executed therein. One or all of the modules are examples of a computer program being executed by a trusted processing circuit of the trusted processing environment.

As already mentioned above, the 'Home Base Station' 1500 is physically under the control of the customer and therefore a special handling is provided as far as the collection of charging relevant data and the creation of Charging Data Records (CDRs) is concerned. Otherwise, the collection of such data could not be deemed reliable, nor could the content of said data be deemed trustworthy.

In various embodiments, at least the accounting module (AM) 1504, the reconfiguration monitoring module (RMM) 1506 and the billing module (BM) 1508 are residing in a secure environment (e.g. the Trusted Operation Environment 1502) that is created e.g. by a Trusted Platform Module (TMP) or a Smart Card (SC) as shown in FIG. 15.

In doing so, it can be assured that both the collected data related to traffic and/or updates and the Charging Data Records (CDRs) generated from said collected data can be deemed reliable and trustworthy.

Also with a TPM or smart card integrated in the 'Home Base Station' system it is easier to establish a secure channel between the 'Home Base Station' 1500 in the field and the Security Gateway 1510 at the edge of the mobile network operator's core network 1512 via a usually insecure network environment (as shown e.g. with respect to the interface S1 in FIG. 7). This allows the secure exchange of information between the 'Home Base Station' 1500 out in the field and the Security Gateway 1510, for example the exchange of final Charging Data Records (CDRs) created by the billing module (BM) 1508 in the 'Home Base Station' 1500, or sets of data prepared by the billing module (BM) 1508 in the 'Home Base Station' 1500 intended for the creation of final Charging Data Records (CDRs) by the Billing System (which may be a part of the CNE) in the mobile network operator's core network 1512, or final data sets containing statistical data on customers' usage patterns, or sets of data prepared in the 'Home Base Station' 1500 by the entity, that is responsible for statistics, intended to perform final analysis on customers' usage patterns by some other network entity (which may also be a part of the CNE), may become much easier.

FIG. 16 shows a method for processing a computer program in a mobile radio communication device in accordance with an embodiment in a flow diagram 1600.

In 1602, a mobile radio base station function for a mobile radio communication with another mobile radio communication device may be provided (e.g. by means of a correspondingly configured mobile radio communication protocol circuit of the mobile radio communication device).

Furthermore, in 1604, communication control signals may be received from a mobile radio network circuit being controlled by a mobile radio network operator to control the mobile radio communication protocol circuit (e.g. by means of a correspondingly configured network control interface circuit of the mobile radio communication device).

In 1606, the computer program may be processed in a trusted processing environment to provide a trusted processing result, wherein the trusted processing environment is outside of the mobile radio network operator's domain.

In an example of this embodiment, the trusted processing environment may use a cryptographic service. The cryptographic service may be selected from a group of cryptographic services consisting of: an access control service, an identification service, an attestation service, an authentication service, an encryption service, a decryption service, and a digital signature service. The method may further include storing cryptographic material used by the cryptographic service in a memory of the mobile radio communication device. The trusted processing environment may be provided in a Trusted Platform Module. Alternatively, the trusted processing environment may be provided in a smart card. The method may further include determining traffic data with respect to an interface of the mobile radio communication device. Furthermore, the interface of the mobile radio communication device may include an internal interface of the mobile radio communication device. The interface of the mobile radio communication device may include a first type of external interface of the mobile radio communication device for communication with another mobile radio communication device and/or a second type of external interface of the mobile radio communication device for communication with the mobile radio network circuit. In another example of this embodiment, the computer program may include a computer program configured to provide information about data traffic in a domain of the mobile radio communication device to the mobile radio network circuit. In yet another example of this embodiment, the computer program may include a computer program configured to provide information about changes in the configuration of the mobile radio communication device to the mobile radio network circuit. In yet another example of this embodiment, the computer program may include a computer program configured to provide charging data to the mobile radio network circuit. In yet another example of this embodiment, the method may further include connecting to a mobile radio network controlled by the mobile radio network operator via a broadband communication connection interface. In yet another example of this embodiment, the broadband communication connection interface may be configured as a wireline broadband communication connection interface. In yet another example of this embodiment, the broadband communication connection interface may be configured in accordance with a broadband communication connection interface selected from a group of broadband communication connection interfaces consisting of: a Digital Subscriber Line broadband communication connection interface, a Cable-based broadband communication connection interface, and a Fibre-based broadband communication connection interface. In yet another example of this embodiment, the method may further include providing a radio signal transmission in accordance with a predefined mobile radio access technology using a mobile radio access technology circuit of the mobile radio communication protocol circuit. The mobile radio access technology circuit may be configured in accordance with a mobile radio access technology selected from a group of mobile radio access technologies consisting of: a Universal Mobile Telecommunications System mobile radio access technology, a Long Term Evolution mobile radio access technology, a Code Division Multiple Access mobile radio access technology, a Code Division Multiple Access 2000 mobile radio access technology, a Freedom of Mobile Multimedia Access mobile radio access technology, a Global System for Mobile Communications mobile radio access technology, and an Enhanced Data rates for GSM Evolution mobile radio access technology. In yet another example of this embodiment, the method may further include providing a radio transmission for a radio communication with another radio communication device using an unlicensed frequency range. The radio signal transmission using the unlicensed frequency range may be provided in accordance with a predefined radio technology using an unlicensed frequency range. In yet another example of this embodiment, the predefined radio technology may be selected from a group of radio technologies consisting of: a Wireless Local Area Network in accordance with an IEEE 802.11 standard, and a Worldwide Interoperability for Microwave Access technology. In yet another example of this embodiment, the method may further include providing a wireline transmission for a communication with another communication device. The wireline transmission may be provided in accordance with a predefined wireline technology. In yet another example of this embodiment, the predefined wireline technology may be selected from a group of wireline technologies consisting of: an Ethernet technology, and a Public Switched Telephone Network technology.

FIG. 17 shows a method for providing a trusted processing result in a mobile radio communication device in accordance with an embodiment in a message flow diagram 1700.

In this embodiment, a CNE 1702 (for example triggered by the MNO), in 1706, generates a request message 1708, with which the CNE 1702 requests a trusted processing result from a home base station 1704, which is located outside the CNE's 1702 and thus outside the MNO's domain, and transmits the request message 1708 to the home base station 1704. The trusted processing result may be any information that should be trustworthy for the CNE 1702 and thus the MNO, and should be provided by the home base station 1704. By way of example, the trusted processing result may be any information as outlined above. After having received the request message 1708 in 1710, the home base station 1704 determines the requested trusted processing result in 1712. This may be carried out by reading pre-stored and predetermined trusted processing result from a memory of the home base station 1704 or by triggering the execution of a computer program which is configured to provide the trusted processing result in a trusted processing environment (trusted for the CNE 1702 and the MNO, for example) of the home base station 1704. After having determined the requested trusted processing result, in 1714, the home base station 1704 generates a response message 1716 which includes the requested trusted processing result and transmits the same to the CNE 1702. Then, the home base station 1704 ends the process on its part in 1718. After having received the response message 1716 in 1720, the CNE 1702 processes (e.g. analyzes) the received trusted processing result in 1722 and then ends the process on its part in 1724. In one embodiment the request message 1708 and/or the response message 1716 may be encrypted and/or digitally signed.

In another embodiment, a mobile radio communication device is provided. The mobile radio communication device may include a controller configured to provide a mobile radio base station function for a mobile radio communication with another mobile radio communication device, to receive communication control signals from a mobile radio network circuit being controlled by a mobile radio network operator to control the mobile radio base station function, and to process a computer program in a trusted processing environment to provide a trusted processing result, wherein the trusted processing environment is outside of the mobile radio network operator's domain. In an example of this embodiment, the controller may further be configured to receive control signals from a user of the mobile radio communication device, the user being different from the mobile radio network operator. In another example of this embodiment, the controller may further be configured to ensure the trusted processing environment using a cryptographic service. In yet another example of this embodiment, the cryptographic service may be selected from a group of cryptographic services consisting of: an access control service, an identification service, an attestation service, an authentication service, an encryption service, a decryption service, and a digital signature service. In yet another example of this embodiment, the mobile radio communication device may further include a memory configured to store cryptographic material. In yet another example of this embodiment, the controller may include a first processor and a second processor. In yet another example of this embodiment, the first processor may be configured to provide a mobile radio base station function for a mobile radio communication with another mobile radio communication device, and to receive communication control signals from a mobile radio network circuit being controlled by a mobile radio network operator to control the mobile radio base station function. Furthermore, the second processor may be configured to process a computer program in a trusted processing environment to provide a trusted processing result, wherein the trusted processing environment is outside of the mobile radio network operator's domain. In yet another example of this embodiment, the second processor may be included in a Trusted Platform Module. In yet another example of this embodiment, the second processor may be included in a smart card. In yet another example of this embodiment, the controller may further be configured to determine traffic data with respect to a particular interface of the mobile radio communication device. In yet another example of this embodiment, the interface of the mobile radio communication device may include an internal interface of the mobile radio communication device. In yet another example of this embodiment, the interface of the mobile radio communication device may include a first type of external interface of the mobile radio communication device for communication with another mobile radio communication device. In yet another example of this embodiment, the interface of the mobile radio communication device may include a second type of external interface of the mobile radio communication device for communication with the mobile radio network circuit. In yet another example of this embodiment, the controller may further be configured to provide information about data traffic in a domain of the mobile radio communication device to the mobile radio network circuit. In yet another example of this embodiment, the controller may further be configured to provide information about changes in the configuration of the mobile radio communication device to the mobile radio network circuit. In yet another example of this embodiment, the controller may further be configured to provide charging data to the mobile radio network circuit. In yet another example of this embodiment, the mobile radio communication device may further include a broadband communication connection interface configured to connect to a mobile radio network controlled by the mobile radio network operator. In yet another example of this embodiment, the broadband communication connection interface may be configured as a wireline broadband communication connection interface. In yet another example of this embodiment, the broadband communication connection interface may be configured in accordance with a broadband communication connection interface selected from a group of broadband communication connection interfaces consisting of a Digital Subscriber Line broadband communication connection interface, a Cable-based broadband communication connection interface, and a Fibre-based broadband communication connection interface. In yet another example of this embodiment, the controller may further be configured to provide a radio signal transmission in accordance with a predefined mobile radio access technology. In yet another example of this embodiment, the mobile radio access technology circuit may be configured in accordance with a mobile radio access technology selected from a group of mobile radio access technologies consisting of: a Universal Mobile Telecommunications System mobile radio access technology, a Long Term Evolution mobile radio access technology, a Code Division Multiple Access mobile radio access technology, a Code Division Multiple Access 2000 mobile radio access technology, a Freedom of Mobile Multimedia Access mobile radio access technology, a Global System for Mobile Communications mobile radio access technology, and an Enhanced Data rates for GSM Evolution mobile radio access technology. In yet another example of this embodiment, the controller may further be configured to provide a radio transmission for a radio communication with another radio communication device using an unlicensed frequency range. In yet another example of this embodiment, the controller may further be configured to provide a radio signal transmission in accordance with a predefined radio technology using an unlicensed frequency range. In yet another example of this embodiment, the controller may further be configured in accordance with a radio technology selected from a group of radio technologies consisting of: a Wireless Local Area Network in accordance with an IEEE 802.11 standard, and a Worldwide Interoperability for Microwave Access technology. In yet another example of this embodiment, the controller may further be configured to provide a wireline transmission for a communication with another communication device. In yet another example of this embodiment, the controller may further be configured to provide a signal transmission in accordance with a predefined wireline technology. In yet another example of this embodiment, the controller may further be configured in accordance with a wireline technology selected from a group of wireline technologies consisting of: an Ethernet technology, and a Public Switched Telephone Network technology.

In another embodiment, a mobile radio home base station is provided. The mobile radio home base station may include a trusted processing circuit configured to process a computer program in a trusted processing environment to provide a trusted processing result. In an example of this embodiment, the mobile radio home base station may further include a user control interface circuit configured to receive control signals from a user of the mobile radio communication device, the user being different from a mobile radio network operator. In another example of this embodiment, the trusted processing circuit may be configured to ensure the trusted processing environment using a cryptographic service. In yet another example of this embodiment, the trusted processing circuit may include a cryptographic circuit configured to provide a cryptographic service. In yet another example of this embodiment, the cryptographic service may be selected from a group of cryptographic services consisting of: an access control service, an identification service, an attestation service, an authentication service, an encryption service, a decryption service, and a digital signature service. In yet another example of this embodiment, the cryptographic circuit may include a memory configured to store cryptographic material. In yet another example of this embodiment, the trusted processing circuit may include a Trusted Platform Module. In yet another example of this embodiment, the trusted processing circuit may include a smart card. In yet another example of this embodiment, the mobile radio home base station may further include a data traffic determination circuit configured to determine traffic data with respect to an interface of the mobile radio home base station. In yet another example of this embodiment, the interface of the mobile radio home base station may include an internal interface of the mobile radio home base station. In yet another example of this embodiment, the interface of the mobile radio home base station may include a first type of external interface of the mobile radio home base station for communication with a mobile radio communication device. In yet another example of this embodiment, the interface of the mobile radio home base station may include a second type of external interface of the mobile radio home base station for communication with a mobile radio network. In yet another example of this embodiment, the trusted processing circuit may include an accounting circuit configured to provide information about data traffic in a domain of the mobile radio home base station to a mobile radio network. In yet another example of this embodiment, the trusted processing circuit may include a reconfiguration monitoring circuit configured to provide information about changes in the configuration of the mobile radio home base station to a mobile radio network. In yet another example of this embodiment, the trusted processing circuit may include a billing circuit configured to provide charging data to a mobile radio network. In yet another example of this embodiment, the mobile radio home base station may further include a broadband communication connection interface configured to connect to a mobile radio network controlled by a mobile radio network operator. In yet another example of this embodiment, the broadband communication connection interface may be configured as a wireline broadband communication connection interface. In yet another example of this embodiment, the broadband communication connection interface may be configured in accordance with a broadband communication connection interface selected from a group of broadband communication connection interfaces consisting of: a Digital Subscriber Line broadband communication connection interface, a Cable-based broadband communication connection interface, and a Fibre-based broadband communication connection interface. In yet another example of this embodiment, the mobile radio home base station may be configured to provide a radio signal transmission in accordance with a predefined mobile radio access technology. In yet another example of this embodiment, the mobile radio home base station may be configured to provide a radio signal transmission in accordance with a mobile radio access technology selected from a group of mobile radio access technologies consisting of: a Universal Mobile Telecommunications System mobile radio access technology, a Long Term Evolution mobile radio access technology, a Code Division Multiple Access mobile radio access technology, a Code Division Multiple Access 2000 mobile radio access technology, a Freedom of Mobile Multimedia Access mobile radio access technology, a Global System for Mobile Communications mobile radio access technology, and an Enhanced Data rates for GSM Evolution mobile radio access technology. In yet another example of this embodiment, the mobile radio home base station may further include an unlicensed frequency radio communication protocol circuit configured to provide a radio transmission for a radio communication with another radio communication device using an unlicensed frequency range. In yet another example of this embodiment, the unlicensed frequency radio communication protocol circuit may be configured to provide a radio signal transmission in accordance with a predefined radio technology using an unlicensed frequency range. In yet another example of this embodiment, the unlicensed frequency radio communication protocol circuit may be configured in accordance with a radio technology selected from a group of radio technologies consisting of: a Wireless Local Area Network in accordance with an IEEE 802.11 standard, and a Worldwide Interoperability for Microwave Access technology. In yet another example of this embodiment, the mobile radio home base station may further include a wireline communication protocol circuit configured to provide a wireline transmission for a communication with another communication device. In yet another example of this embodiment, the wireline communication protocol circuit may be configured to provide a signal transmission in accordance with a predefined wireline technology. In yet another example of this embodiment, the wireline communication protocol circuit may be configured in accordance with a wireline technology selected from a group of wireline technologies consisting of: an Ethernet technology, and a Public Switched Telephone Network technology.

In yet another embodiment, a mobile radio communication device is provided. The mobile radio communication device may include a mobile radio communication protocol module configured to provide a mobile radio base station function for a mobile radio communication with another mobile radio communication device, a network control interface module configured to receive communication control signals from a mobile radio network module being controlled by a mobile radio network operator to control the mobile radio communication protocol module, and a trusted processing environment to process a computer program to provide a trusted processing result for a mobile radio network, wherein the trusted processing environment is outside of the mobile radio network operator's domain. In an example of this embodiment, the mobile radio communication device may further include a user control interface configured to receive control signals from a user of the mobile radio communication device, the user being different from the mobile radio network operator. In another example of this embodiment, the trusted processing environment may be configured to use a cryptographic service. In yet another example of this embodiment, the cryptographic service may be selected from a group of cryptographic services consisting of: an access control service, an identification service, an attestation service, an authentication service, an encryption service, a decryption service, and a digital signature service. In yet another example of this embodiment, the mobile radio communication device may further include a memory configured to store cryptographic material. In yet another example of this embodiment, the trusted processing environment may be implemented in a Trusted Platform Module. In yet another example of this embodiment, the trusted processing environment may be implemented in a smart card. In yet another example of this embodiment, the mobile radio communication device may further include a data traffic determination module configured to determine traffic data with respect to an interface of the mobile radio communication device. In yet another example of this embodiment, the interface of the mobile radio communication device may include an internal interface of the mobile radio communication device. In yet another example of this embodiment, the interface of the mobile radio communication device may include a first type of external interface of the mobile radio communication device for communication with another mobile radio communication device. In yet another example of this embodiment, the interface of the mobile radio communication device may include a second type of external interface of the mobile radio communication device for communication with the mobile radio network module. In yet another example of this embodiment, the trusted processing environment may include an accounting module configured to provide information about data traffic in a domain of the mobile radio communication device to the mobile radio network module. In yet another example of this embodiment, the trusted processing environment may include a reconfiguration monitoring module configured to provide information about changes in the configuration of the mobile radio communication device to the mobile radio network module. In yet another example of this embodiment, the trusted processing environment may include a billing module configured to provide charging data to the mobile radio network module. In yet another example of this embodiment, the mobile radio communication device may further include a broadband communication connection interface configured to connect to a mobile radio network controlled by the mobile radio network operator. In yet another example of this embodiment, the broadband communication connection interface may be configured as a wireline broadband communication connection interface. In yet another example of this embodiment, the broadband communication connection interface may be configured in accordance with a broadband communication connection interface selected from a group of broadband communication connection interfaces consisting of: a Digital Subscriber Line broadband communication connection interface, a Cable-based broadband communication connection interface, and a Fibre-based broadband communication connection interface. In yet another example of this embodiment, the mobile radio communication protocol module may include a mobile radio access technology module configured to provide a radio signal transmission in accordance with a predefined mobile radio access technology. In yet another example of this embodiment, the mobile radio access technology module may be configured in accordance with a mobile radio access technology selected from a group of mobile radio access technologies consisting of: a Universal Mobile Telecommunications System mobile radio access technology, a Long Term Evolution mobile radio access technology, a Code Division Multiple Access mobile radio access technology, a Code Division Multiple Access 2000 mobile radio access technology, a Freedom of Mobile Multimedia Access mobile radio access technology, a Global System for Mobile Communications mobile radio access technology, and an Enhanced Data rates for GSM Evolution mobile radio access technology. In yet another example of this embodiment, the mobile radio communication device may further include an unlicensed frequency radio communication protocol module configured to provide a radio transmission for a radio communication with another radio communication device using an unlicensed frequency range. In yet another example of this embodiment, the unlicensed frequency radio communication protocol module may be configured to provide a radio signal transmission in accordance with a predefined radio technology using an unlicensed frequency range. In yet another example of this embodiment, the unlicensed frequency radio communication protocol module may be configured in accordance with a radio technology selected from a group of radio technologies consisting of: a Wireless Local Area Network in accordance with an IEEE 802.11 standard, and a Worldwide Interoperability for Microwave Access technology. In yet another example of this embodiment, the mobile radio communication device may further include a wireline communication protocol module configured to provide a wireline transmission for a communication with another communication device. In yet another example of this embodiment, the wireline communication protocol module may be configured to provide a signal transmission in accordance with a predefined wireline technology. In yet another example of this embodiment, the wireline communication protocol module may be configured in accordance with a wireline technology selected from a group of wireline technologies consisting of: an Ethernet technology, and a Public Switched Telephone Network technology.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
   a mobile radio communication protocol circuit configured to provide a mobile radio base station function for a mobile radio communication with another mobile radio communication device;
   a network control interface circuit configured to receive communication control signals from a mobile radio network circuit being controlled by a mobile radio network operator to control the mobile radio communication protocol circuit;
   a trusted processing circuit configured to process a computer program in a trusted processing environment to provide a trusted processing result, wherein the trusted processing circuit is outside of the mobile radio network operator's domain;
   a data traffic determination circuit configured to collect data traffic with respect to an interface of the mobile radio communication device; and
   a broadband communication connection interface configured to connect to at least one of a mobile radio network controlled by the mobile radio network operator or the Internet.

2. The mobile radio communication device of claim 1, further comprising:
   a user control interface circuit configured to receive control signals from a user of the mobile radio communication device, the user being different from the mobile radio network operator.

3. The mobile radio communication device of claim 1, wherein the trusted processing circuit is configured to ensure the trusted processing environment using a cryptographic service.

4. The mobile radio communication device of claim 3, wherein the cryptographic service is selected from a group of cryptographic services consisting of:
   an access control service;
   an identification service;
   an attestation service,
   an authentication service;
   an encryption service;
   a decryption service; and
   a digital signature service.

5. The mobile radio communication device of claim 1, wherein the trusted processing circuit comprises a Trusted Platform Module.

6. The mobile radio communication device of claim 1, wherein the trusted processing circuit comprises a smart card.

7. The mobile radio communication device of claim 1, wherein the trusted processing circuit comprises an accounting circuit configured to provide information about data traffic in a domain of the mobile radio communication device to the mobile radio network circuit.

8. The mobile radio communication device of claim 1, wherein the trusted processing circuit comprises a reconfiguration monitoring circuit configured to provide information about changes in the configuration of the mobile radio communication device to the mobile radio network circuit.

9. The mobile radio communication device of claim 1, wherein the trusted processing circuit comprises a billing circuit configured to provide charging data to the mobile radio network circuit.

10. The mobile radio communication device of claim 1, further comprising:
    a traffic measurement circuit assigned to the broadband communication connection interface.

11. The mobile radio communication device of claim 1, further comprising:
    a plurality of broadband communication connection interfaces configured to connect to at least one of a mobile radio network controlled by the mobile radio network operator or the Internet.

12. The mobile radio communication device of claim 11, further comprising:
    a plurality of traffic measurement circuits assigned to the broadband communication connection interfaces in order to distinguish Internet traffic from mobile radio network related traffic.

13. The mobile radio communication device of claim 1, further comprising:
    an unlicensed frequency radio communication protocol circuit configured to provide a radio transmission for a radio communication with another radio communication device using an unlicensed frequency range.

14. A mobile radio communication device, comprising a controller configured to:
    provide a mobile radio base station function for a mobile radio communication with another mobile radio communication device;

receive communication control signals from a mobile radio network circuit being controlled by a mobile radio network operator to control the mobile radio base station function;

process a computer program in a trusted processing environment to provide a trusted processing result, wherein the trusted processing environment is outside of the mobile radio network operator's domain; and to collect traffic data with respect to an interface of the mobile radio communication device; and a memory configured to store cryptographic material.

15. The mobile radio communication device of claim 14, wherein the controller is further configured to ensure the trusted processing environment using a cryptographic service.

16. The mobile radio communication device of claim 14, wherein the controller comprises a first processor and a second processor.

17. The mobile radio communication device of claim 16, wherein the first processor is configured to provide a mobile radio base station function for a mobile radio communication with another mobile radio communication device;

receive communication control signals from a mobile radio network circuit being controlled by a mobile radio network operator to control the mobile radio base station function;

wherein the second processor is configured to process a computer program in a trusted processing environment to provide a trusted processing result, wherein the trusted processing environment is outside of the mobile radio network operator's domain.

18. The mobile radio communication device of claim 16, wherein the second processor is included in a Trusted Platform Module.

19. The mobile radio communication device of claim 16, wherein the second processor is included in a smart card.

20. A mobile radio communication device, comprising:

a mobile radio communication protocol module configured to provide a mobile radio base station function for a mobile radio communication with another mobile radio communication device;

a network control interface module configured to receive communication control signals from a mobile radio network module being controlled by a mobile radio network operator to control the mobile radio communication protocol module;

a trusted processing environment to process a computer program to provide a trusted processing result for a mobile radio network, wherein the trusted processing environment is outside of the mobile radio network operator's domain; and a data traffic determination circuit configured to collect traffic data with respect to an interface of a mobile radio home base station, wherein the trusted processing environment comprises a module selected from a group of modules consisting of:

an accounting module configured to provide information about data traffic in a domain of the mobile radio communication device to the mobile radio network module;

a reconfiguration monitoring module configured to provide information about changes in the configuration of the mobile radio communication device to the mobile radio network module; and a billing module configured to provide charging data to the mobile radio network module.

* * * * *